(12) United States Patent
Ito

(10) Patent No.: US 12,664,806 B2
(45) Date of Patent: Jun. 23, 2026

(54) IMAGE PROCESSING APPARATUS, IMAGE PROCESSING METHOD, AND STORAGE MEDIUM, THAT OBTAIN A SINGLE CONTINUOUS CHARACTER STRING BASED ON CHARACTER RECOGNITION RESULTS OF A SCANNED IMAGE

(71) Applicant: CANON KABUSHIKI KAISHA, Tokyo (JP)

(72) Inventor: Keisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 223 days.

(21) Appl. No.: 18/535,197

(22) Filed: Dec. 11, 2023

(65) Prior Publication Data

US 2024/0193975 A1 Jun. 13, 2024

(30) Foreign Application Priority Data

Dec. 13, 2022 (JP) .................................. 2022-198880

(51) Int. Cl.
*G06V 30/00* (2022.01)
*G06F 40/166* (2020.01)
*G06V 30/14* (2022.01)
*G06V 30/22* (2022.01)

(52) U.S. Cl.
CPC ............ *G06V 30/22* (2022.01); *G06F 40/166* (2020.01); *G06V 30/1456* (2022.01)

(58) Field of Classification Search
CPC .... G06V 30/22; G06V 30/1456; G06V 30/10; G06F 40/166
See application file for complete search history.

(56) References Cited

U.S. PATENT DOCUMENTS

| | | | |
|---|---|---|---|
| 9,047,528 B1* | 6/2015 | Guha | G06V 10/267 |
| 10,860,785 B2 | 12/2020 | Miyamoto | |
| 11,252,287 B2* | 2/2022 | Soga | H04N 1/00411 |
| 11,620,840 B2* | 4/2023 | Mori | H04N 1/0044 |
| | | | 358/1.13 |
| 2003/0007397 A1* | 1/2003 | Kobayashi | G06F 40/166 |
| | | | 365/200 |
| 2003/0123732 A1* | 7/2003 | Miyazaki | G06V 30/412 |
| | | | 382/182 |
| 2006/0078200 A1* | 4/2006 | Koyama | G06V 30/2455 |
| | | | 382/181 |

(Continued)

FOREIGN PATENT DOCUMENTS

JP 6891073 B2 6/2021

*Primary Examiner* — Wilson W Tsui
*Assistant Examiner* — David Faber
(74) *Attorney, Agent, or Firm* — ROSSI, KIMMS & McDOWELL LLP

(57) ABSTRACT

An image processing apparatus and method displays a scanned image obtained by scanning a document, including handwritten characters, printed characters, and objects on a UI screen for a user to designate a character area in the scanned image. When the designated character area includes strings of handwritten characters and a string of printed characters, or an object existing between the strings of handwritten characters, a predetermined delimiter character is inserted in place of the string of printed characters or the object forming a single continuous character string.

17 Claims, 24 Drawing Sheets

③ name       character type attribute : handwritten

| MoNDEN | (given name) WAKABA |

MONDEN  WAKABA

(56) References Cited

U.S. PATENT DOCUMENTS

| | | | | |
|---|---|---|---|---|
| 2014/0078559 A1* | 3/2014 | Wu | .................... | G06V 30/1456 |
| | | | | 358/452 |
| 2022/0189186 A1* | 6/2022 | Takahashi | ............ | G06V 30/166 |
| 2022/0189187 A1* | 6/2022 | Narumi | ..................... | G06T 7/11 |
| 2024/0037323 A1* | 2/2024 | Ong | ..................... | G06F 40/169 |

* cited by examiner

```
{
  "formId": "common",
  "learningContent": {
  "metadataArray": [
    {
      "key": "filename",
      "value": ["title", "sep", "date", "sep", "name"]
    },
  ],
  "rectInfoArray": [
    {
      "key": "title",
      "regions": []
    },
    {
      "key": "date",
      "regions": []
    },
    {
      "key": "name",
      "regions": []
    }
  ]
  }
}
```

FIG.8A

```
{
  "formId": "aaaaaaaa-ffff-49ab-acf8-55558888eeee",
  "learningContent": {
    "metadataArray": [
      {
        "key": "filename",
        "value": ["title", "sep", "date", "sep", "name"]
      },
    ],
    "rectInfoArray": [
      {
        "key": "title",
        "regions": [
          {
            "rect": {"x": 743, "y": 47, "width": 531, "height": 97},
          },
        ],
      },
      {
        "key": "date",
        "regions": [
          {
            "rect": {"x": 1231, "y": 195, "width": 211, "height": 77},
          },
          {
            "rect": {"x": 1479, "y": 221, "width": 53, "height": 53},
          },
          {
            "rect": {"x": 1555, "y": 179, "width": 51, "height": 93},
          },
          {
            "rect": {"x": 1640, "y": 218, "width": 49, "height": 65},
          },
          {
            "rect": {"x": 1731, "y": 181, "width": 47, "height": 89},
          },
          {
            "rect": {"x": 1819, "y": 221, "width": 48, "height": 55},
          },
        ]
      },
      {
        "key": "name",
        "regions": [
          {
            "rect": {"x": 643, "y": 505, "width": 203, "height": 105},
          },
          {
            "rect": {"x": 1079, "y": 501, "width": 237, "height": 101},
          },
        ]
      },
    }
  }
}
```

FIG.8B

```
{
  "matched": false,
  "formId": "aaaaaaaa-ffff-42cd-3c32-32449999dddd",
  "matchingScore": 0,
  "recommendResult": {
    "metadataArray": [
      {
        "key": "filename",
        "value": ["title", "sep", "date", "sep", "name"]
      },
    ],
    "rectInfoArray": [
      {
        "key": "title",
        "regions": []
      },
      {
        "key": "date",
        "regions": []
      },
      {
        "key": "name",
        "regions": []
      }
    ]
  }
}
```

FIG.8C

Figure 8D:
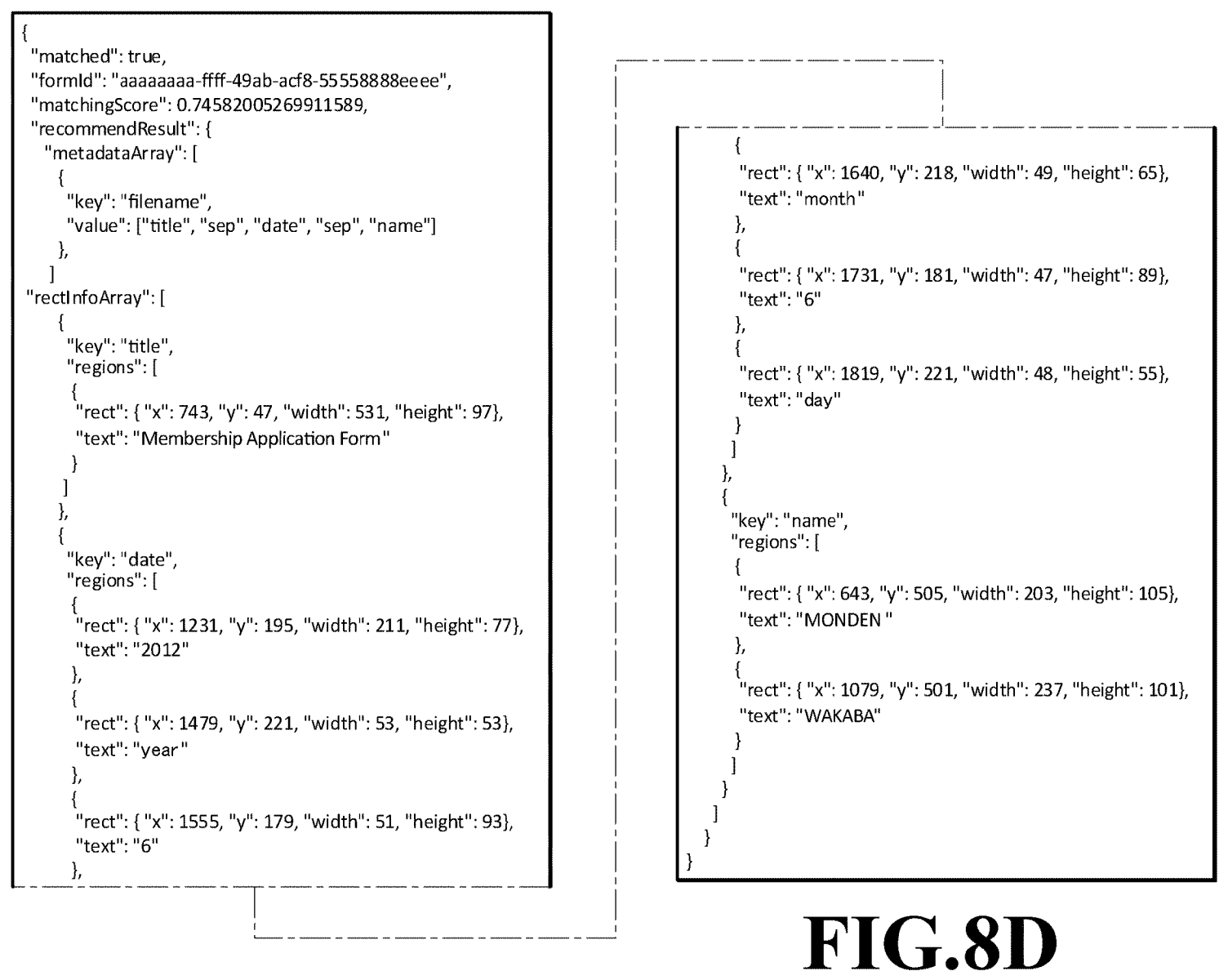

```
{
  "matched": true,
  "formId": "aaaaaaa-ffff-49ab-acf8-5555888eeee",
  "matchingScore": 0.7458200526991189,
  "recommendResult": {
    "metadataArray": [
      {
        "key": "filename",
        "value": ["title", "sep", "date", "sep", "name"]
      },
    ]
    "rectInfoArray": [
      {
        "key": "title",
        "regions": [
          {
            "rect": {"x": 743, "y": 47, "width": 531, "height": 97},
            "text": "Membership Application Form"
          }
        ]
      },
      {
        "key": "date",
        "regions": [
          {
            "rect": {"x": 1231, "y": 195, "width": 211, "height": 77},
            "text": "2012"
          },
          {
            "rect": {"x": 1479, "y": 221, "width": 53, "height": 53},
            "text": "year"
          },
          {
            "rect": {"x": 1555, "y": 179, "width": 51, "height": 93},
            "text": "6"
          },
          {
            "rect": {"x": 1640, "y": 218, "width": 49, "height": 65},
            "text": "month"
          },
          {
            "rect": {"x": 1731, "y": 181, "width": 47, "height": 89},
            "text": "6"
          },
          {
            "rect": {"x": 1819, "y": 221, "width": 48, "height": 55},
            "text": "day"
          }
        ]
      },
      {
        "key": "name",
        "regions": [
          {
            "rect": {"x": 643, "y": 505, "width": 203, "height": 105},
            "text": "MONDEN"
          },
          {
            "rect": {"x": 1079, "y": 501, "width": 237, "height": 101},
            "text": "WAKABA"
          }
        ]
      }
    ]
  }
}
```

| Storage Destination Setting Screen | | | |
|---|---|---|---|

902 Transmit    903 Edit    904 Delete

901

| Scanned Document List | | | |
|---|---|---|---|
| Business form name | Transmission destination | Status | Type |
| 001 | cloud storage A | unlearned | estimate form |
| 002 | cloud storage A | unlearned | estimate form |
| 003 | cloud storage A | learned | bill AAA |
| 004 | cloud storage A | unlearned | estimate form |
| 005 | cloud storage A | learned | bill BBB |

911    912    913    914

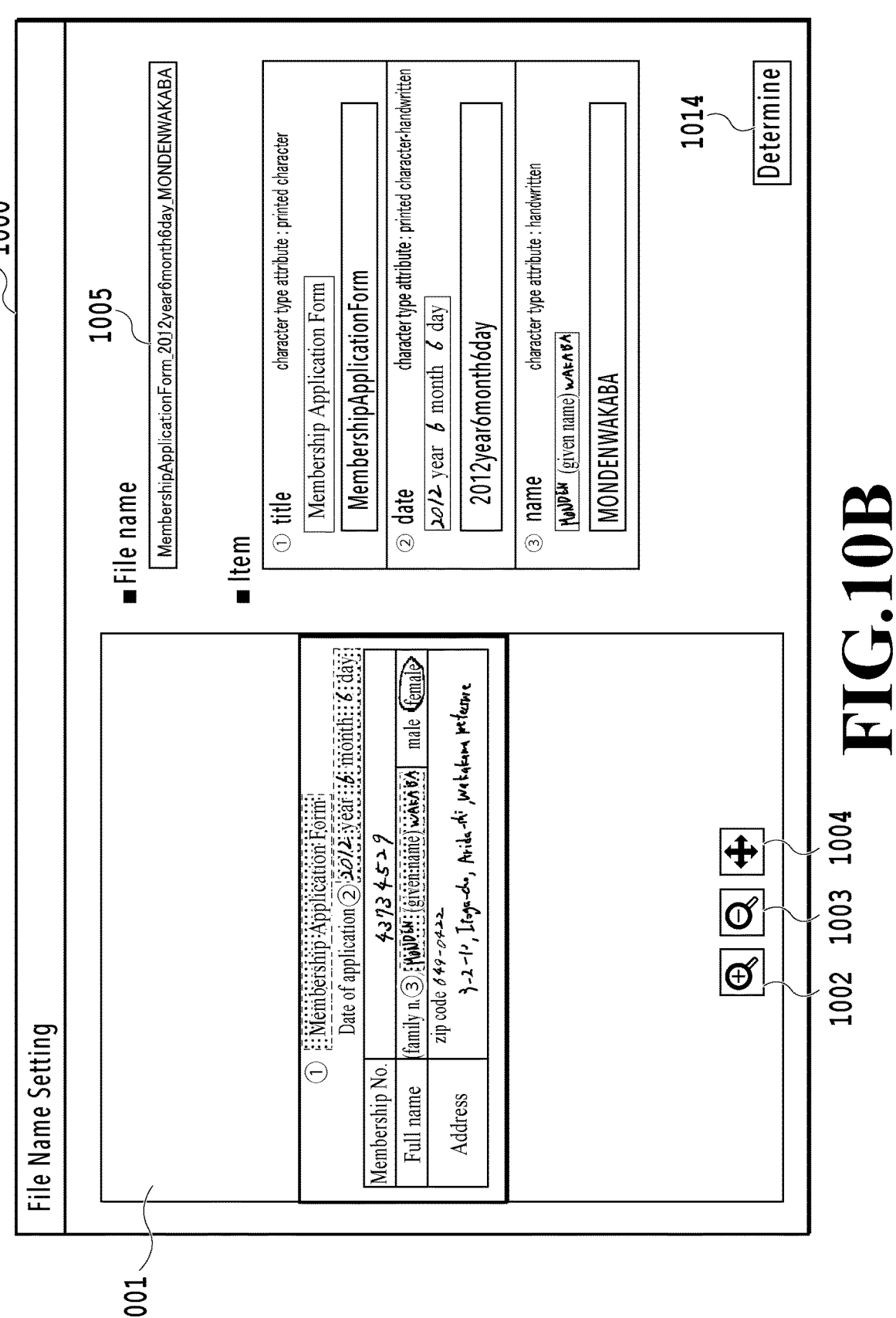

1000

1001

File Name Setting

① ∷Membership∷Application∷Form∷
Date of application ② 2012 year 6 month 6 day

| Membership No. | 4313 45-29 |
|---|---|
| Full name | (family n. ③ MONDEN (given name) WAKABA    male (female) |
| Address | zip code 649-0422  3-2-1P, Itoga-cho, Arida-shi wakatema prefecture |

1002  1003  1004

■ File name          1005

MembershipApplicationForm_2012year6month6day_MONDENWAKABA

■ Item

① title          character type attribute : printed character

Membership Application Form

MembershipApplicationForm

② date          character type attribute : printed character-handwritten 2012 year 6 month 6 day 2012year6month6day ③ name          character type attribute : handwritten MONDEN (given name) WAKABA

MONDENWAKABA

1014

Determine

FIG.10B

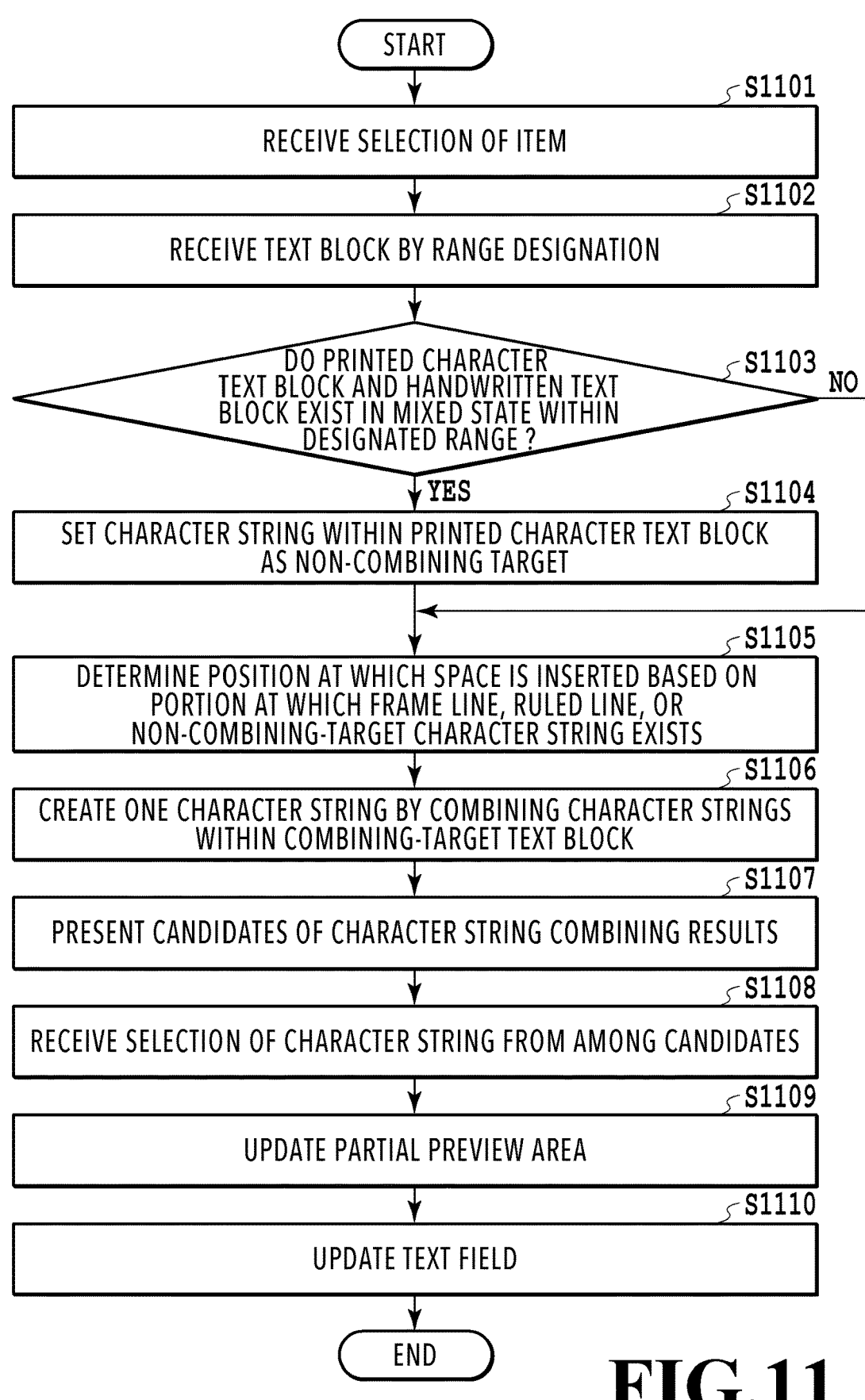

START

S1101
RECEIVE SELECTION OF ITEM

S1102
RECEIVE TEXT BLOCK BY RANGE DESIGNATION

S1103
DO PRINTED CHARACTER
TEXT BLOCK AND HANDWRITTEN TEXT
BLOCK EXIST IN MIXED STATE WITHIN
DESIGNATED RANGE ?    NO

YES    S1104
SET CHARACTER STRING WITHIN PRINTED CHARACTER TEXT BLOCK
AS NON-COMBINING TARGET

S1105
DETERMINE POSITION AT WHICH SPACE IS INSERTED BASED ON
PORTION AT WHICH FRAME LINE, RULED LINE, OR
NON-COMBINING-TARGET CHARACTER STRING EXISTS

S1106
CREATE ONE CHARACTER STRING BY COMBINING CHARACTER STRINGS
WITHIN COMBINING-TARGET TEXT BLOCK

S1107
PRESENT CANDIDATES OF CHARACTER STRING COMBINING RESULTS

S1108
RECEIVE SELECTION OF CHARACTER STRING FROM AMONG CANDIDATES

S1109
UPDATE PARTIAL PREVIEW AREA

S1110
UPDATE TEXT FIELD

END

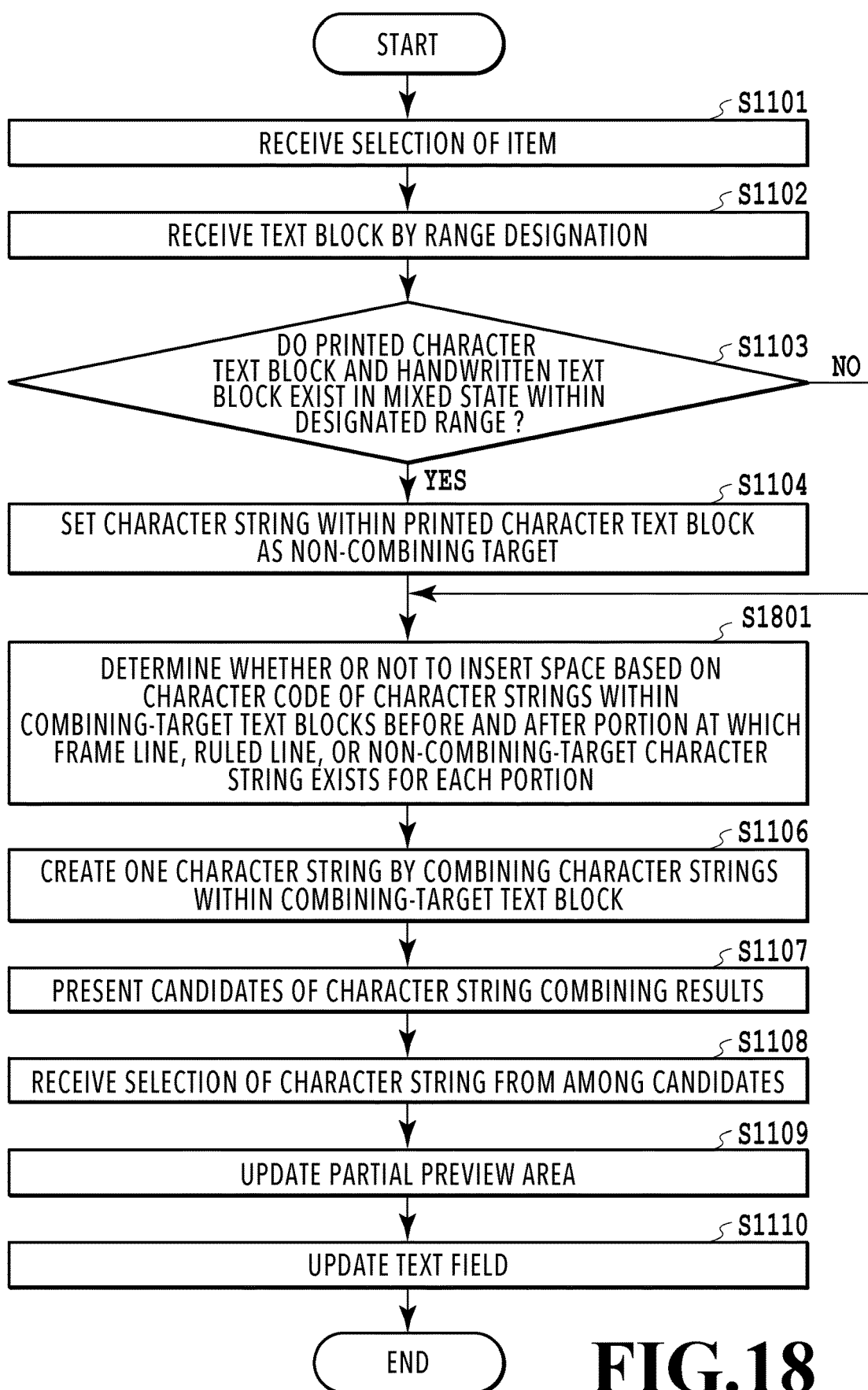

START

S1101
RECEIVE SELECTION OF ITEM

S1102
RECEIVE TEXT BLOCK BY RANGE DESIGNATION

S1103
DO PRINTED CHARACTER TEXT BLOCK AND HANDWRITTEN TEXT BLOCK EXIST IN MIXED STATE WITHIN DESIGNATED RANGE ?    NO

YES

S1104
SET CHARACTER STRING WITHIN PRINTED CHARACTER TEXT BLOCK AS NON-COMBINING TARGET

S1801
DETERMINE WHETHER OR NOT TO INSERT SPACE BASED ON CHARACTER CODE OF CHARACTER STRINGS WITHIN COMBINING-TARGET TEXT BLOCKS BEFORE AND AFTER PORTION AT WHICH FRAME LINE, RULED LINE, OR NON-COMBINING-TARGET CHARACTER STRING EXISTS FOR EACH PORTION

S1106
CREATE ONE CHARACTER STRING BY COMBINING CHARACTER STRINGS WITHIN COMBINING-TARGET TEXT BLOCK

S1107
PRESENT CANDIDATES OF CHARACTER STRING COMBINING RESULTS

S1108
RECEIVE SELECTION OF CHARACTER STRING FROM AMONG CANDIDATES

S1109
UPDATE PARTIAL PREVIEW AREA

S1110
UPDATE TEXT FIELD

END          FIG.18

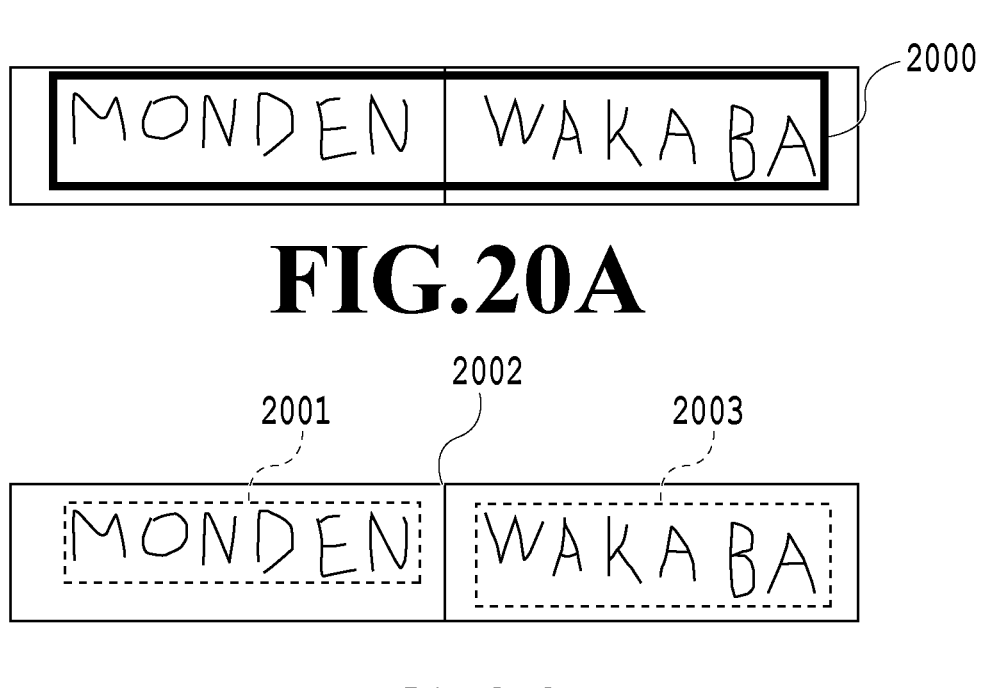
FIG.20A
FIG.20B
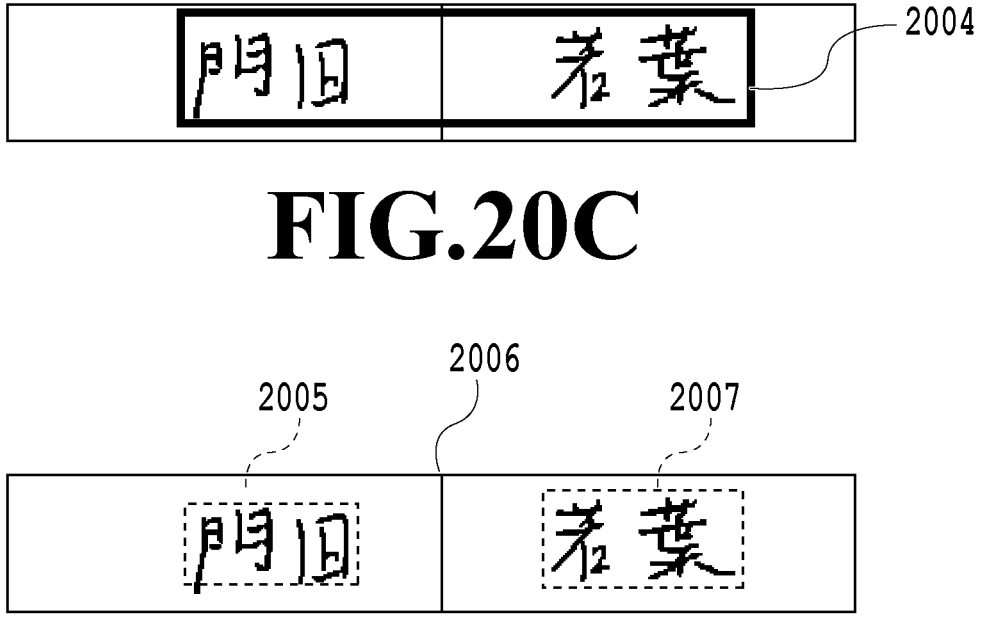
FIG.20C
FIG.20D

IMAGE PROCESSING APPARATUS, IMAGE PROCESSING METHOD, AND STORAGE MEDIUM, THAT OBTAIN A SINGLE CONTINUOUS CHARACTER STRING BASED ON CHARACTER RECOGNITION RESULTS OF A SCANNED IMAGE

BACKGROUND

Field

The present disclosure relates to a technique to create a character string of a file name or the like of a scanned image by combining character recognition results of the scanned image.

Description of the Related Art

There is a system that manages a scanned image obtained by scanning a document, such as a business form, by attaching a file name or the like by using a character string, which is character recognition results of a character string area designated by a user.

Japanese Patent No. 6891073 has disclosed a technique to generate a single continuous character string shown below in accordance with a positional relationship between a plurality of designated character blocks in a case where a user designates the plurality of character blocks (character areas). That is, in a case where the positional relationship between the designated plurality of character blocks does not satisfy a predetermined condition, a single continuous character string is generated, in which a delimiter character is inserted between a plurality of character strings corresponding to the plurality of character blocks. In a case where the positional relationship between the designated plurality of character blocks satisfies the predetermined condition, a single continuous character string is generated, in which a delimiter character is not inserted between the plurality of character strings corresponding to the plurality of character blocks.

SUMMARY

Note that there is a case where a single continuous character string not desired by a user is generated with the technique of Japanese Patent No. 6891073 depending on the way character blocks are designated. As shown in FIG. 20A to FIG. 20D to be described later, in a case where character blocks corresponding to the family name (for example, MONDEN) of handwritten characters and the given name (for example, WAKABA) of handwritten characters respectively adjacent to each other via a frame line are designated, it may happen that a single continuous character string (for example, MONDEN WAKABA) obtained by combining the family name and the given name is generated. Further, as shown in FIG. 12A to 12F to be described later, in a case where a character block including the handwritten characters "MONDEN", the frame line, the printed characters "(given name)", and the handwritten characters "WAKABA" is designated, it may happen that a single continuous character string (for example, MONDEN (given name) WAKABA) including the printed characters "(given name)" is generated.

The present disclosure has been made in view of the above-described problems and an object of the present disclosure is to provide a technique capable of obtaining a single continuous character string desired by a user by using character recognition results of a scanned image.

The image processing apparatus according to one aspect of the present disclosure has: a first obtaining unit configured to obtain a scanned image obtained by scanning a document including a handwritten character; a second obtaining unit configured to obtain character recognition results for a handwritten character block corresponding to the handwritten character included in the scanned image, character recognition results for a printed character block corresponding to a printed character included in the scanned image, and an object other than characters included in the scanned image; and a display control unit configured to display the scanned image on a UI screen for a user to designate a character area in the scanned image, wherein the display control unit inserts, in a case where a plurality of handwritten characters is included within a character area designated by the user and the printed character or the object exists between the plurality of handwritten characters, a predetermined delimiter character in place of the printed character or the object and displays on the UI screen as a single continuous character string combining character recognition results of handwritten character blocks corresponding to the plurality of handwritten characters.

Further features of the present disclosure will become apparent from the following description of exemplary embodiments with reference to the attached drawings.

BRIEF DESCRIPTION OF THE DRAWINGS

FIG. 8A is a diagram showing a data structure example of a common file name setting rule used in character recognition processing;

FIG. 8B is a diagram showing a data structure example of a file setting rule for each business form used in character recognition processing;

FIG. 8C is a diagram showing a data structure example, which is results of character recognition processing and input information storage processing using a common file name setting rule;

FIG. 8D is a diagram showing a data structure example, which is results of character recognition processing and input information storage processing using a file setting rule for each business form;

FIG. 10A and FIG. 10B are each a file name setting screen example;

FIG. 11 is a flowchart showing a detailed flow of text block designation reception processing;

FIG. 18 is a flowchart showing a detailed flow of the text block designation reception processing;

FIG. 20A to FIG. 20D are each a diagram for explaining a text block designation reception example.

DESCRIPTION OF THE EMBODIMENTS

In the following, embodiments for embodying the technique of the present disclosure are explained by using the drawings. The following embodiments are not intended to limit the technique of the present disclosure according to the claims and all combinations of features explained in the following embodiments are not necessarily indispensable to the solution of the technique of the present disclosure.

First Embodiment

[Entire Configuration]

Figure 1:
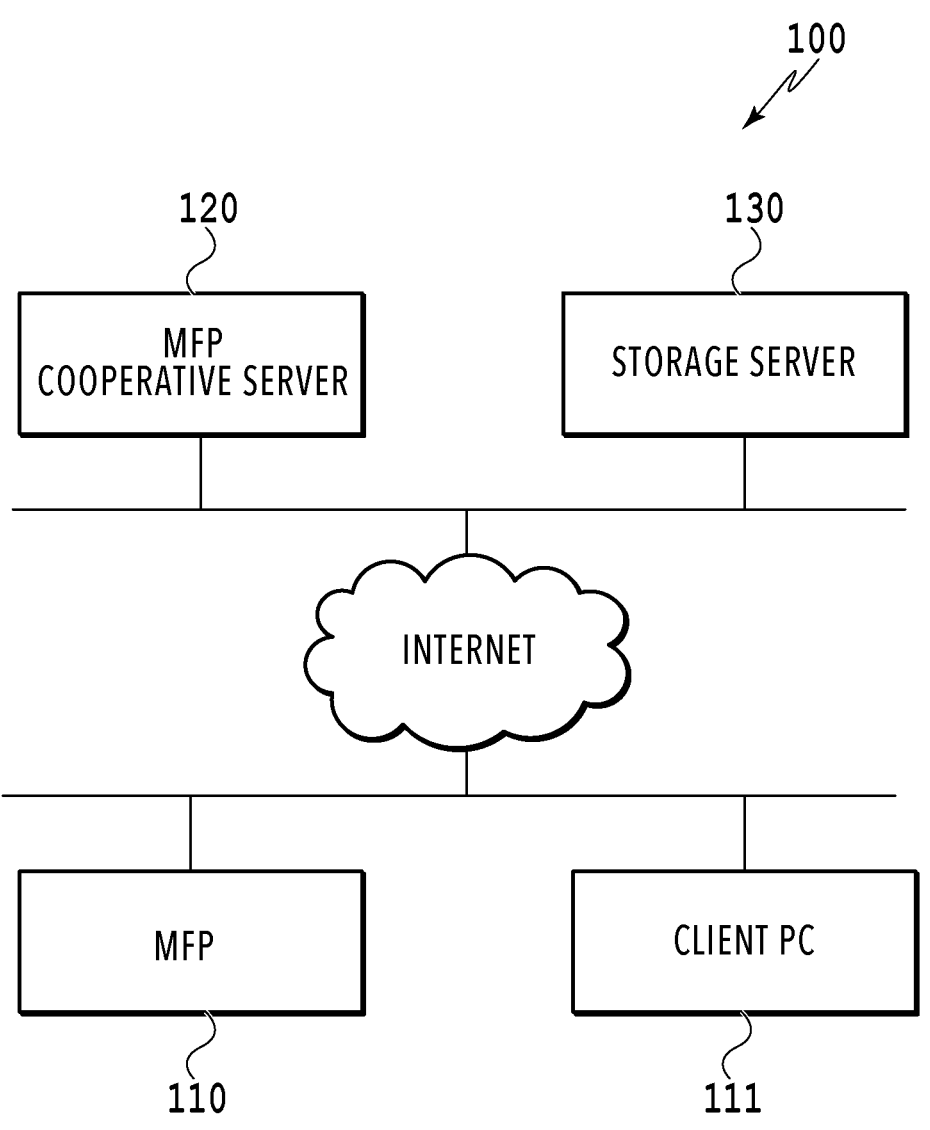
FIG. 1 is a diagram showing a configuration example of an entire image processing system.

FIG. 1 is a diagram showing a configuration example of an entire image processing system according to the present embodiment. An image processing system 100 includes an MFP (Multi-function Peripheral) 110, a client PC (Personal Computer) 111, an MFP cooperative server 120, and a storage server 130. The MFP 110 and the client PC 111 are connected to the servers providing various services on the internet via a LAN (Local Area Network) so as to be capable of communication.

The MFP 110 is one example of an image processing apparatus having the scanner function. The MFP 110 is a multi-function peripheral having a plurality of functions, such as the printing function and the BOX storage function, in addition to the scanner function. The client PC 111 is one example of a computer in which an application receiving the provision of a service for which the MFP cooperative server 120 is requested is installed. The server apparatuses 120 and 130 are each one example of an image processing apparatus providing cloud services. The server apparatus 120 of the present embodiment provides services, such as performing image analysis for a scanned image received from the MFP 110 and storing the scanned image on the server of its own and transferring a request from the MFP 110 to the server apparatus 130 providing other services. In the following, the cloud service provided by the server apparatus 120 is called "MFP cooperative service". The server apparatus 130 provides cloud services (in the following, called "storage services"), such as storing a file that is sent via the internet and providing a stored file in response to a request from a web browser of a mobile terminal (not shown schematically) or the like. In the present embodiment, the server apparatus 120 providing MFP cooperative services is called "MFP cooperative server" and the server apparatus 130 providing storage services is called "storage server".

Though the image processing system 100 of the present embodiment has the configuration including the MFP 110, the client PC 111, the MFP cooperative server 120, and the storage server 130, the configuration is not limited to this. For example, the MFP 110 may also include the function of the client PC 111 and the MFP cooperative server 120. Further, the MFP cooperative server 120 may be connected to the MFP 110 and the client PC 111 via a LAN in place of the internet. Furthermore, it may also be possible to replace the storage server 130 with a mail server performing mail delivery services and apply the mail server to a scene in which a scanned image of a document is transmitted by being attached to a mail.

[Hardware Configuration of MFP]

Figure 2:
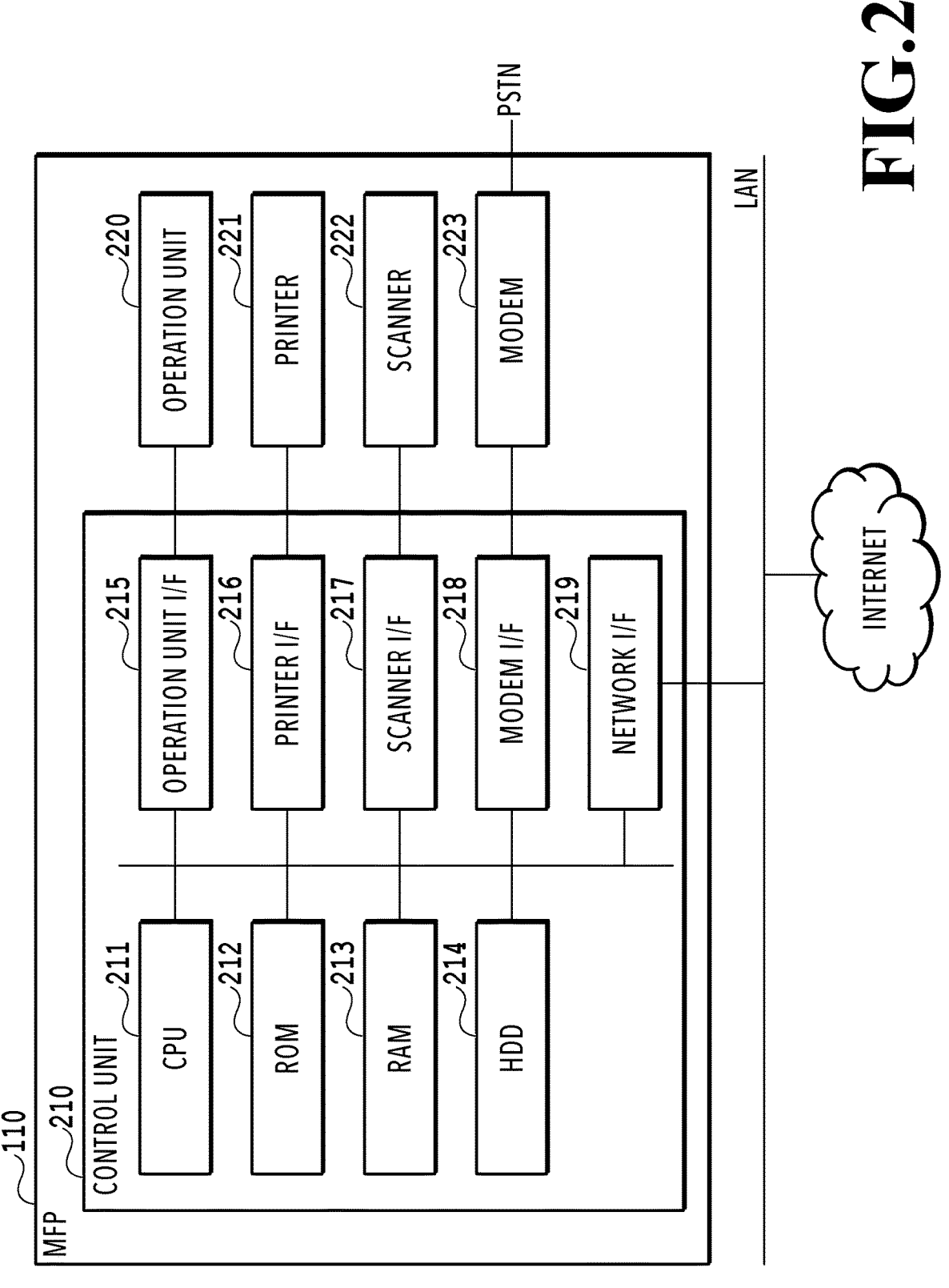
FIG. 2 is a diagram showing a hardware configuration example of an MFP.

FIG. 2 is a diagram showing a hardware configuration example of the MFP 110. The MFP 110 has a control unit 210, an operation unit 220, a printer 221, a scanner 222, and a modem 223. The control unit 210 has each of units 211 to 219 below and controls the operation of the entire MFP 110. The CPU 211 is a central processing unit and reads and executes control programs (programs corresponding to various functions shown in a software configuration diagram, to be described later) stored in the ROM (Read Only Memory) 212. The RAM (Random Access Memory) 213 is used as a temporary storage area, such as a main memory and a work area, of the CPU 211. In the present embodiment, though the one CPU 211 performs each piece of processing shown in flowcharts, to be described later, by using the one memory (the RAM 213 or the HDD 214), this is not limited. For example, it may also be possible to perform each piece of processing by causing a plurality of CPUs and a plurality of RAMs or HDDs to cooperate. The HDD (Hard Disk Drive) 214 is a large-capacity storage unit configured to store image data and various programs. The operation unit I/F 215 is an interface that connects the operation unit 220 and the control unit 210. The operation unit 220 includes a touch panel that functions as a display unit, a keyboard and the like and receives the operation/input/instructions by a user. The touch operation to a touch panel includes the operation with a human finger and the operation with a touch pen. The printer I/F 216 is an interface that connects the printer 221 and the control unit 210. The image data for print is transferred from the control unit 210 to the printer 221 via the printer I/F 216 and printed on a printing medium such as paper. The scanner I/F 217 is an interface that connects the scanner 222 and the control unit 210. The scanner 222 generates image data (that is, scanned image data) by optically reading a document set on a document table or ADF (Auto Document Feeder), not shown schematically, and inputs the image data to the control unit 210 via the scanner I/F 217. It is possible for the MFP 110 to perform file transmission or mail transmission, in addition to print and output (copy) the image data generated in the scanner 222 by the printer 221. The modem I/F 218 is an interface that connects the modem 223 and the control unit 210. The modem 223 performs facsimile communication of image data with a facsimile machine on the PSTN (Public Switched Telephone Networks). The network I/F 219 is an interface that connects the control unit 210 (MFP 100) to a LAN. The MFP 110 transmits image data and information to each service on the internet, receives various types of information, and so on, by using the network I/F 219.

[Hardware Configuration of Client PC and Server Apparatus]

Figure 3:
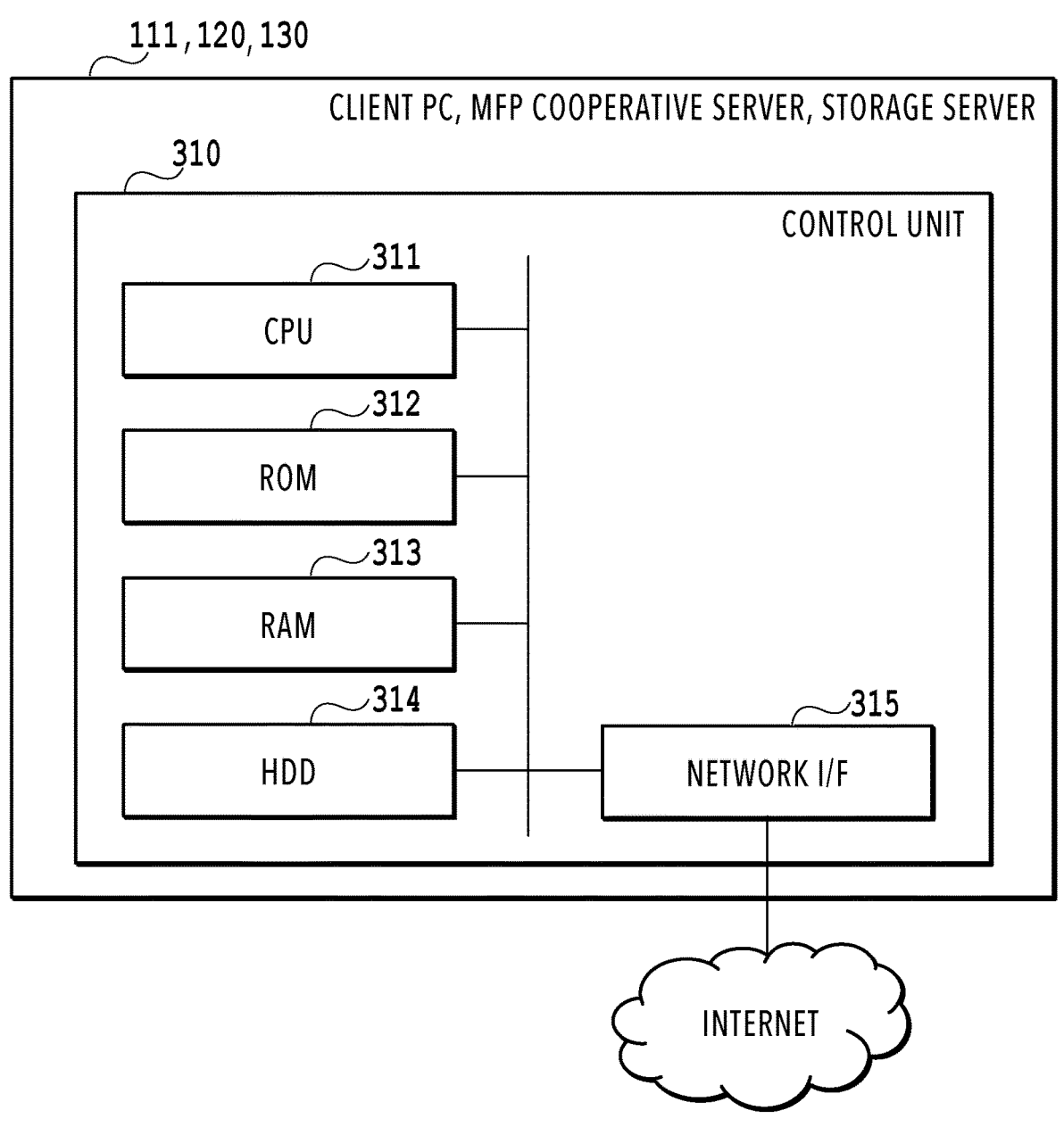
FIG. 3 is a diagram showing a hardware configuration example of a client PC, an MFP cooperative server, and a storage server.

FIG. 3 is a diagram showing a hardware configuration example of the client PC 111, the MFP cooperative server 120, and the storage server 130. The client PC 111, the MFP cooperative server 120, and the storage server 130 have a hardware configuration common to them. That is, the client PC 111, the MFP cooperative server 120, and the storage server 130 each have a control unit 310 including a CPU 311, a ROM 312, a RAM 313, an HDD 314, and a network I/F 315. The CPU 311 controls the entire operation by reading control programs stored in the ROM 312 and performing various types of processing. The RAM 313 is used as a temporary storage area, such as a main memory and a work area, of the CPU 311. The HDD 314 is a large-capacity storage unit configured to store image data and various programs. The network I/F 315 is an interface that connects the control unit 310 to the internet. The MFP cooperative server 120 and the storage server 130 receive requests for various types of processing from other apparatuses (MFP 110, and the like) via the network I/F 315 and return processing results in accordance with the requests.

[Software Configuration of Image Processing System]

Figure 4:
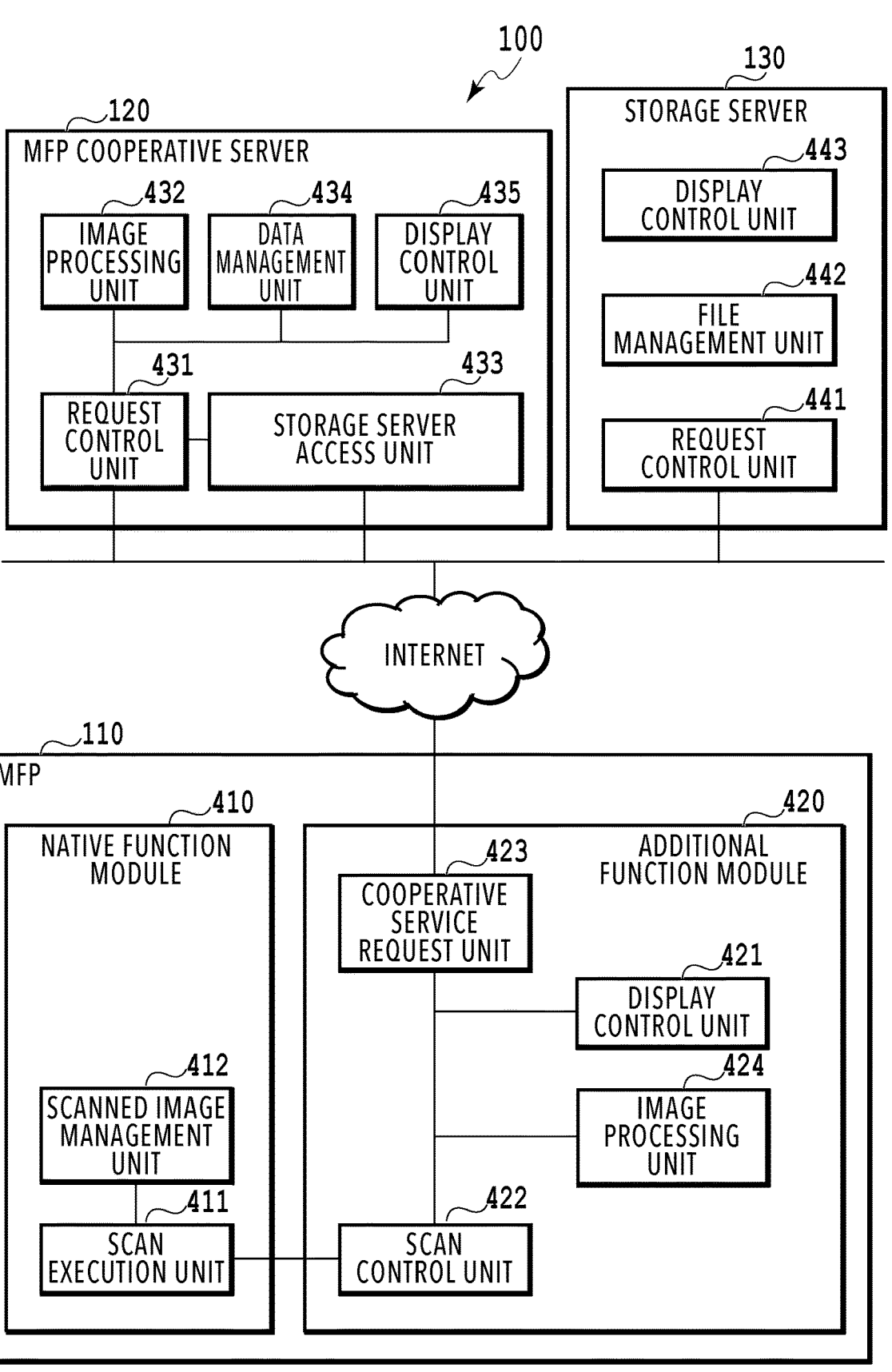
FIG. 4 is a diagram showing a software configuration example of an image processing system.

FIG. 4 is a block diagram showing a software configuration example of the image processing system 100 according to the present embodiment. In the following, the software configuration corresponding to the role of each of the MFP 110, the MFP cooperative server 120, and the storage server 130 configuring the image processing system 100 is explained in order. In the following, explanation is given by narrowing the various functions of each apparatus to the functions relating to the processing from computerizing (filing) a document until storing it in the storage server 130.

<Software Configuration of MFP>

The function modules of the MFP 110 are roughly divided into two modules, that is, a native function module 410 and an additional function module 420. While the native function module 410 is an application included as a standard one in the MFP 110, the additional function module 420 is an application installed additionally in the MFP 110. The additional function unit 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. The additional function module 420 has a display control unit 421, a scan control unit 422, a cooperative service request unit 423, and an image processing unit 424.

The display control unit 421 displays a user interface screen (UI screen) for receiving various user operations on a liquid crystal display unit having a touch panel function of the operation unit 220. The various user operations include, for example, input of login authentication information used for accessing the MFP cooperative server 120, scan setting, giving instructions to start a scan, input of a file name, giving instructions to set a file name, giving instructions to store a file and the like.

The scan control unit 422 gives instructions to perform scan processing to the scan execution unit 411 along with scan setting information in accordance with the user operation (for example, pressing down of "Start scan" button, not shown schematically) performed on the UI screen. The scan execution unit 411 causes the scanner 222 to perform the document reading operation via the scanner I/F 217 and generates scanned image data by reading a document (paper document) placed on a document table glass in accordance with the instructions to perform scan processing from the scan control unit 422. The generated scanned image data is stored in the HDD 214 by the scanned image management unit 412. At this time, the scan control unit 422 is notified of information on a scanned image identifier uniquely indicating the stored scanned image data. The scanned image identifier is a number, symbol, alphabetical letter and the like for uniquely identifying the image scanned in the MFP 110. The scan control unit 422 obtains, for example, the filing-target scanned image data from the scanned image management unit 412 by using the above-described scanned image identifier. Then, the scan control unit 422 instructs the cooperative service request unit 423 to make a request for processing necessary for filing to the MFP cooperative server 120.

The cooperative service request unit 423 makes requests for various types of processing to the MFP cooperative server 120, receives responses thereto, and so on. The various types of processing include, for example, login authentication, scanned image analysis, transmission of scanned image data and the like. For the transmission and reception with the MFP cooperative server 120, a protocol is used, such as REST (Representational State Transfer) and SOAP (Simple Object Access Protocol). The transmission and reception with the MFP cooperative server 120 are not limited to those and it may also be possible to use another communication unit. The image processing unit 424 generates an image that is used on the UI screen displayed by the display control unit 421 by performing predetermined processing for scanned image data.

It may also be possible for an apparatus (client PC and the like, not shown schematically) different from the MFP 110 to include the above-described additional function module 420. That is, such a system may be acceptable in which the client PC makes a request to analyze the scanned image obtained by the MFP 110, performs the setting of a file name based on the analysis results, and the like.

<Software Configuration of Server Apparatus>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with the received request contents.

The image processing unit 432 performs image modification processing, such as rotation and inclination correction, in addition to analysis processing, such as area separation processing, character area analysis processing, similar document (business form) determination processing, and character recognition processing (OCR processing), for the scanned image that is sent from the MFP 110. In the present embodiment, explanation is given by taking a membership application form with a field to which handwritten characters are input as an example of a processing-target document.

The storage server access unit 433 makes a request for processing to the storage server 130. The cloud service has made public a variety of interfaces for storing a file in the storage server, obtaining a stored file, and so on, by using a protocol, such as REST and SOAP. The storage server access unit 433 makes a request to the storage server 130 by using the interface of the storage server made public. The data management unit 434 stores and manages user information, image analysis results, various types of setting data, learning business form data and the like, which are managed in the MFP cooperative server 120. Further, the data management unit 434 stores and manages a file name setting rule.

The display control unit 435 receives a request from a web browser running on the PC or the mobile terminal (both not shown schematically) connected via the internet and returns screen information (HTML, CS5 and the like) necessary for the screen display. It is possible for a user to check the user information registered in the MFP cooperative server 120, change the scan setting, and so on, via the screen that is displayed on the web browser.

Next, the software configuration of the storage server 130 is explained. The storage server 130 has a request control unit 441, a file management unit 442, and a display control unit 443. The request control unit 441 stands by in the state of being capable of receiving a request from an external apparatus and in the present embodiment, the request control unit 441 instructs the file management unit 442 to store a received file and read a stored file in response to a request from the MFP cooperative server 120. Then, the request control unit 441 returns a response in accordance with the request to the MFP cooperative server 120. The display control unit 443 receives a request from a web browser running on the PC or the mobile terminal (both not shown schematically) connected via the internet and returns screen configuration information (HTML, CS5 and the like) necessary for the screen display. It is possible for a user to check, obtain, and so on, the stored file registered in the storage server 130 via the screen that is displayed on the web browser.

In FIG. 4, though the configuration example is explained in which the MFP 110 has the additional function module 420, the present embodiment is not limited to this configuration. For example, it may also be possible for the client PC 111 include the function of the additional function module 420.

[Flow of Processing of Entire Image Processing System]

Figure 5:
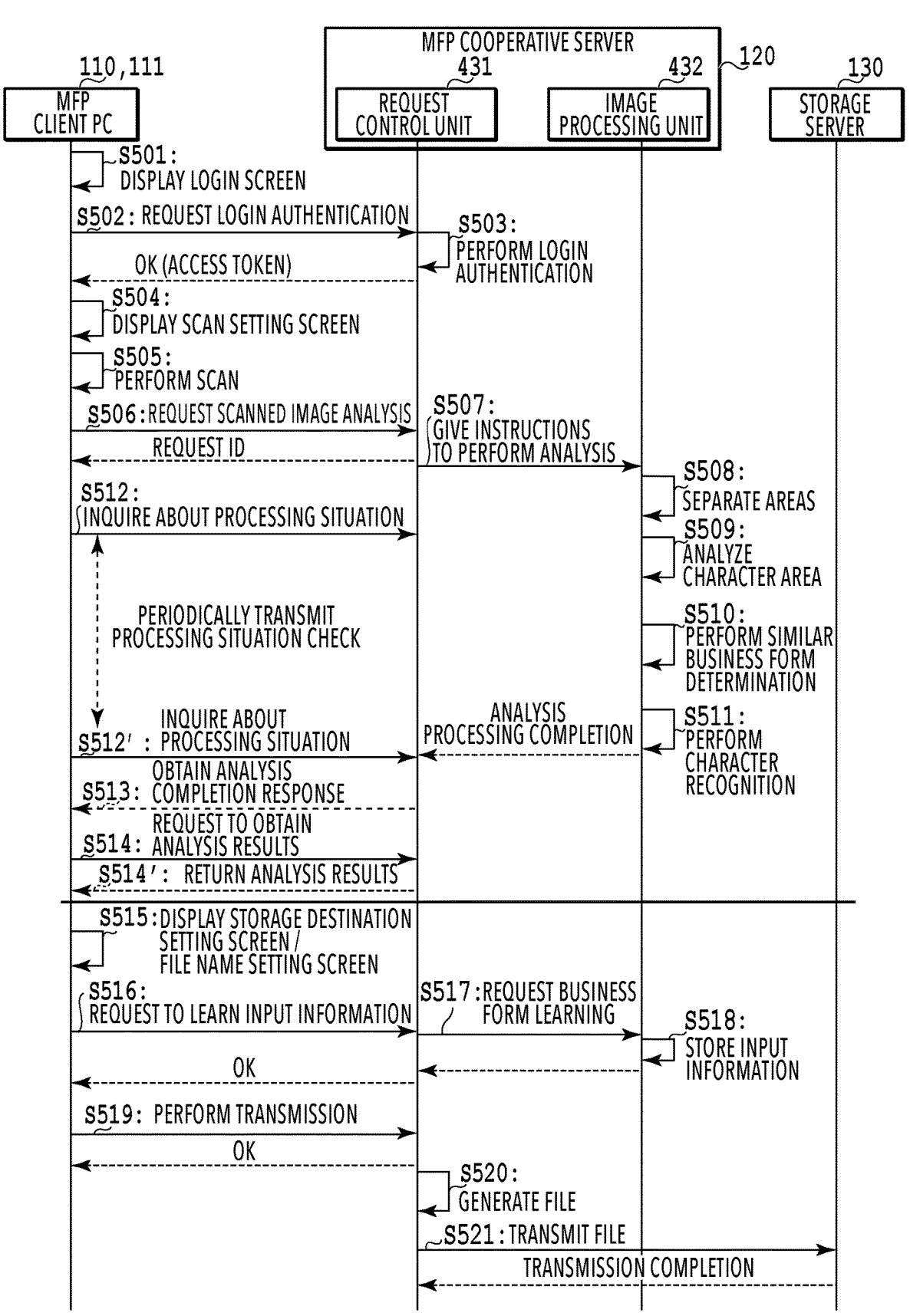
FIG. 5 is a sequence diagram showing a flow of processing between each apparatus.

FIG. 5 is a sequence diagram showing a flow of processing between the apparatuses in a case where a scanned image obtained by performing a scan in the MFP 110 is filed and stored in (transmitted to) the storage server 130. Here, operations between the apparatuses are explained mainly. Though the sequence diagram in FIG. 5 explains a case where the MFP 110 performs operations with the MFP cooperative server 120, a configuration may be acceptable in which obtaining analysis results, to be explained later, displaying a screen, giving instructions to perform learning and the like are performed by the client PC 111, not by the MFP 110.

The MFP 110 displays a main screen on which buttons for performing each function that is provided in the normal state are arranged on a touch panel. A configuration may also be acceptable in which buttons are provided separately from the main screen and the input unit and the display unit are implemented by separate apparatuses.

In the MFP 110, an application (in the following, called scan application) for transmitting (storing) a scanned image of a document, such as a business form, to (in) the storage server via the MFP cooperative server 120 is installed as the additional function module 420. The button for using the function of this application is also displayed on the main screen of the MFP 110. In a case where this button is pressed down by the user operation, a screen for transmitting (storing) the scanned image obtained by performing a scan to (in) the storage server 130 via the MFP cooperative server 120 is displayed and the series of processing shown in the sequence diagram in FIG. 5 is started. In the following, along the sequence diagram in FIG. 5, the operations performed between the apparatuses are explained in a time series. In the following explanation, a symbol "S" represents a step.

At S501, by the scan application being executed, the MFP 110 displays a UI screen (in the following, described as "login screen") on which to input login authentication information for accessing the MFP cooperative server 120 on the operation unit 220.

At S502, in a case where a user inputs a user name and a password, which are registered in advance, to input fields on the login screen, respectively, and presses down a login button, a request for login authentication is transmitted to the MFP cooperative server 120

At S503, the MFP cooperative server 120 having received the request for login authentication performs authentication processing by using the use ID (user name) and the password included in the request. As a result of the authentication processing, in a case where it is checked that the user is a genuine user, the MFP cooperative server 120 returns an access token to the MFP 110. After this, by sending the access token together in a case where the MFP 110 makes various requests to the MFP cooperative server 120, the user having logged in is identified. In the present embodiment, it is assumed that the completion of the login to the MFP cooperative server 120 completes the login to the storage server 130 at the same time. Because of this, the user associates in advance the user ID for utilizing the MFP cooperative service and the user ID for utilizing the storage service with each other via a web browser or the like of a PC (not shown schematically) on the internet. Due to this, in a case where the login authentication to the MFP cooperative server 120 succeeds, the login authentication to the storage server 130 is also completed at the same time, and therefore, it is possible to omit the operation to log in to the storage server 130. Then, it is also made possible for the MFP cooperative server 120 to deal with a request relating to the storage service from a user having logged in to the MFP cooperative server 120. It may also be possible to perform the login authentication method generally by using the publicly known method (Basic authentication, Digest authentication, authorization using OAuth and the like).

At S504, upon receipt the notification of the completion of the login processing from the MFP cooperative server 120, the MFP 110 displays a UI screen for scan setting (in the following, described as "scan setting screen") on the operation unit 220.

At S505, in a case where the "Start scan" button (not shown schematically) within the scan setting screen is pressed down in the state where a scan-target document (paper business form or the like) is set on a document table glass or ADF of the MFP 110 by the log-in user having completed the scan setting, the MFP 110 performs a scan. The scan is performed in accordance with the various scan settings set on the scan setting screen. Due to this, image data obtained by computerizing the paper document is generated. In a case where the processing at S510 is performed by the client PC 111, an external scanner, not shown schematically, connected to the client PC 111 is used.

At S506, the MFP 110 transmits the scanned image data obtained by the scan to the MFP cooperative server 120 along with an analysis request therefor.

At S507, in the MFP cooperative server 120 having received the request to analyze the document scanned image, the request control unit 431 instructs the image processing unit 432 to perform image analysis processing. After that, the MFP cooperative server 120 returns a request ID ("processId"), which is an identifier uniquely indicating the analysis that the MFP cooperative server 120 is requested to perform to the MFP 110 without waiting for the completion of the image analysis processing. The image processing unit 432 having received the instructions to perform image analysis processing performs image analysis processing for the document image relating to the analysis request. At S508, the image processing unit 432 separates the areas existing within the scanned image into handwritten areas and non-handwritten areas. Details of area separation processing will be described later by using the drawings.

At S509, the image processing unit 432 performs character area analysis for each area (handwritten area, non-handwritten area) separated at S508. The character area analysis is processing to classify the foreground area into the character string areas (also called character blocks) and the areas other than the character string areas after separating the image into the foreground areas and the background areas. In the following explanation, explanation is given by taking the circumscribed rectangle surrounding particularly the character string area as the text block. Here, for the handwritten area and the non-handwritten area, it is desirable to change the character area analysis processing for each area. The reason is that, for example, even in the same character string area, the image features that are utilized for the character area analysis, such as the character density and the edge characteristics within the circumscribed rectangle, are different between the printed character and the handwritten character, and further, that in the non-handwritten area, different from the handwritten area, the ruled line and the frame line exist, which are objects other than the character, and the types of foreground area are also different. In the following explanation, explanation is given by describing the character area analysis for the non-handwritten area as printed character area analysis and the character area analysis for the handwritten area as handwritten character area analysis. At S509, as the results of the printed character area analysis and the handwritten character area analysis, respectively, printed character arrangement information and handwritten character arrangement information are obtained.

At S510, the image processing unit 432 determines whether or not there exists an image having the arrangement of character areas similar to that of the scanned image of this time in the past scanned images by comparing the past scanned images and the scanned image of this time. This processing is called similar business form determination. As character arrangement information on the past scanned image, information that is stored and accumulated in the data management unit 434 by the processing at S518, to be described later, is utilized.

In the first embodiment, first, the scanned image of this time and each scanned image obtained by performing a scan in the past are compared in a one-to-one manner and the degree of similarity is calculated, which represents to what extent the shapes and arrangement of the character string areas included within the image are similar. For the calculation of the degree of similarity, the text blocks of the printed character arrangement information obtained at S509 are utilized. There is a method in which alignment is performed by using the text block group of the scanned image of this time and the text block group of the registered past scanned images, the square of the sum total of the areas in which each text block of the scanned image of this time and each text block of the registered past scanned image overlap is found (taken as value A), the product of the sum total of the areas of the text blocks of the scanned image of this time and the sum total of the areas of the text blocks of the registered past scanned image is further found (taken as value B), and then, the value obtained by dividing the value A by the value B is taken as the degree of similarity. According to the above method of calculating the degree of similarity, only the text blocks of the printed character arrangement information are used, and therefore, it is possible to perform matching with the past business form without being affected by the handwritten area that changes depending on a person who writes characters and written contents. The method of calculating the degree of similarity is not limited to that described above. For example, it may also be possible to utilize the position and shape of the ruled line in place of text blocks, or perform matching that combines text blocks and ruled lines. Further, it may also be possible to perform matching by comparing the images between the non-handwritten areas separated at S508.

The calculation of the degree of similarity described above is performed between the scanned image of this time and all the scanned image registered in the past. Then, the scanned image whose degree of similarity is higher than or equal to a predetermined value and whose degree of similarity is the highest is determined to be the same type of learned scanned image as that of the image scanned this time. Further, in a case where there is not a single scanned image whose degree of similarity is higher than or equal to the predetermined value, it is determined that the scanned image of this time is an unlearned business form, which has not been scanned in the past.

At S511, the image processing unit 432 obtains file name generation results by performing character recognition processing for the analyzed area based on the determination results obtained at S510. Details of the character recognition processing will be described later by using FIG. 8A to FIG. 8D.

While the above image analysis processing is being performed, the MFP 110 periodically (for example, from every hundred of milliseconds, to about every several milliseconds, and the like) sends an inquiry about the processing situation to the MFP cooperative server 120 by using the request ID (processId) described above (S512 to S512'). This inquiry is sent repeatedly until the completion response (S513) of the image analysis processing from the MFP cooperative server 120 is obtained. Upon receipt of the inquiry about the processing situation, the MFP cooperative server 120 checks the progress situation of the image analysis processing corresponding to the request ID and returns a response indicating that the processing in progress in a case where the processing is not completed. Further, in a case where the processing is completed, the MFP cooperative server 120 returns a response indicating completion. To "status" of the response, a character string indicating the current processing situation is input, specifically, in a case where the processing is in progress in the MFP cooperative server 120, "processing" is input and in a case where the processing is completed, "completed" is input. There is a case where a character string of another status is input, for example, such as "failed" indicating that the processing has failed. In the response at the time of the completion of the processing (in a case where status is completed), in addition to status information, information relating to the document image analysis results, information relating to the scan setting, and the like are included.

After receiving the processing completion response, the MFP 110 requests for the image analysis results from the MFP cooperative server 120 by using the URL indicating the storage destination of the image analysis results, which is included in the response (S514). Upon receipt of the request, the request control unit 431 of the MFP cooperative server 120 returns image analysis results information (analysis results) (S514'). That is, the MFP 110 obtains the image analysis results information. In this results information, information is included, which is obtained by associating the scanned image, the similar business form determination results, the character recognition results, and the file name generation results, which are all obtained as the results at S506, and S508 to S511, and putting them into a list.

Then, the series of processing (S504 to S511) from displaying the scan setting screen until obtaining the image analysis results is repeated the number of times corresponding to the number of filing-target documents.

Figure 10A:
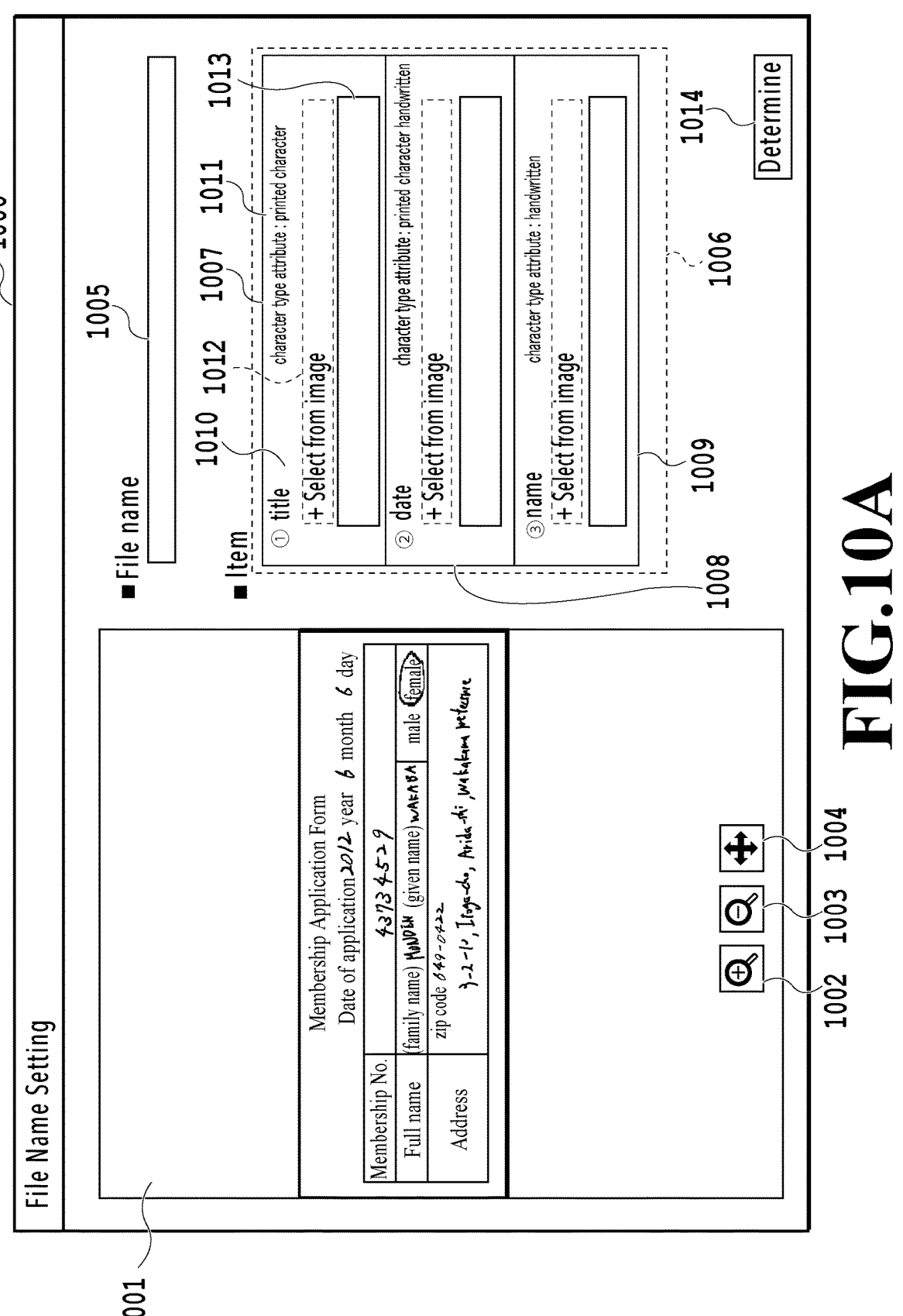

At S515, the MFP 110 displays UI screens (in the following, described as "storage destination setting screen"/ "file name setting screen") for setting a file name to a document image and storing the document image in the storage server 130 by using the results information on the image analysis processing, which is obtained at S514'. FIG. 10A and FIG. 10B are each a diagram showing a file name setting screen example that is displayed in the MFP 110. Details of processing on the storage destination setting screen and the file name setting screen will be described later.

At S516, in a case where a file name is set to a scanned image on the file name setting screen and a "Determine" button 1014 is pressed down, the MFP 110 transmits a request to learn input information to the request control unit 431 of the MFP cooperative server 120. By the request to learn input information, information on the text blocks used for setting the file name and the character string that is used as the set file name are transmitted.

At S517, the request control unit 431 of the MFP cooperative server 120 having received the learning request requests the image processing unit 432 for business form learning.

At S518, the image processing unit 432 stores the printed character arrangement information and the handwritten character arrangement information, which is results of the character area analysis, the information on the text blocks used for the file name, which are received by the request for input information learning, and the character strings in the data management unit 434.

At S519, the MFP 110 transmits the scanned image and the information on the file name or the like, which is set after filing the scanned image, to the MFP cooperative server 120. Upon receipt of the request, the MFP cooperative server 120 returns the response that the request has been received normally as well as starting file generation processing. Upon receipt of the response of transmission, the MFP 110 terminates the processing and returns to the scan setting screen display at S504.

At S520, the MFP cooperative server 120 obtains information on the file format that is transmitted to the storage server 130 from the scan setting registered in the MFP cooperative server 120 and generates a file from the scanned image based on the setting.

At S521, the request control unit 431 of the MFP cooperative server 120 sets the file generated at S520 to the file name received at S519 and transmits the file to the storage server 130.

[Details of Area Separation Processing and Character Area Analysis Processing]

Figures 6A, 6B, 6C, 6D, 6E:
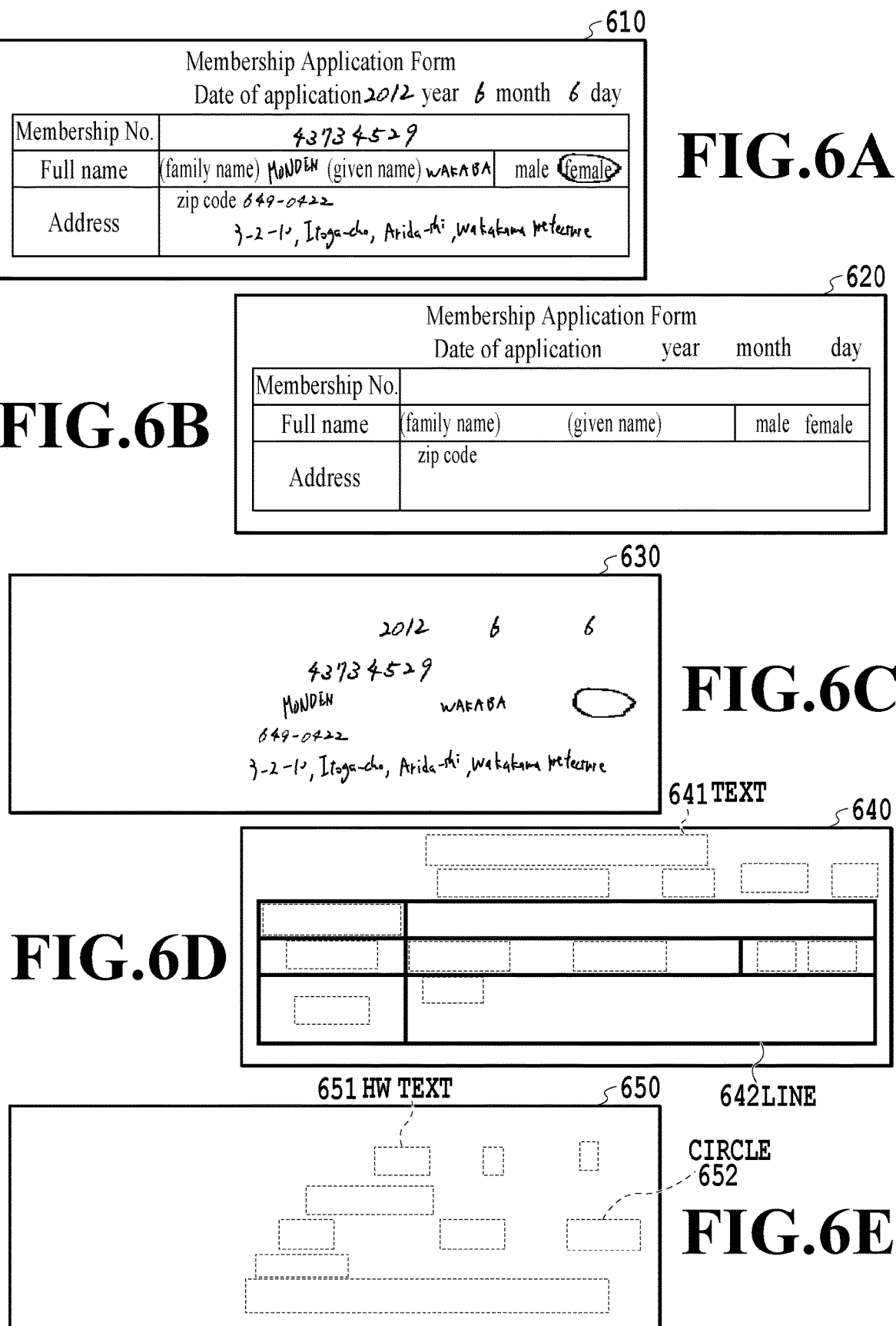
FIG. 6A to FIG. 6E are diagrams showing an area separation example and a character area analysis example.

FIG. 6A to FIG. 6E are diagrams for explaining the area separation processing and the character area analysis processing. FIG. 6A shows a scanned image example of a document (business form). FIG. 6B shows an image of non-handwritten areas obtained by performing the area separation processing for the scanned image of the document shown in FIG. 6A and FIG. 6C shows an image of handwritten areas obtained by performing the area separation processing for the scanned image of the document shown in FIG. 6A. FIG. 6D shows printed character (non-handwritten character) arrangement information obtained by performing printed character area analysis processing for the image of the non-handwritten areas shown in FIG. 6B and FIG. 6E shows handwritten character arrangement information obtained by performing handwritten character area analysis processing for the image of the handwritten areas shown in FIG. 6C. The area separation processing (S508) and printed character/handwritten character area analysis processing (S509) are performed in the image processing unit 432.

As shown in FIG. 6A, a scanned image 610 of a business form includes, printed characters, ruled lines, frame lines, and handwritten characters. As shown in FIG. 6B, an image 620 of non-handwritten areas includes printed characters and foreground areas other than character string areas, such as ruled lines and frame lines. That is, it can be said that the image 620 of non-handwritten areas includes printed characters and objects other than characters. As shown in FIG. 6C, an image 630 of handwritten areas includes not only handwritten characters but also a foreground area, such as a handwritten circle.

The area separation processing is explained in more detail. The area separation processing is processing to determine handwritten pixels within a scanned image by utilizing features, such as jaggies and fading unique to a handwritten area, and separate the scanned image into images including only handwritten pixels (handwritten areas) and images including printed characters and backgrounds (non-handwritten areas). In order to implement this processing, semantic segmentation using deep learning is utilized. For learning, a plurality of mixed images of handwritten characters and printed characters, in which a handwritten image and a printed image overlap each other, is generated and used as learning data. Further, a binary image is prepared, which is obtained by performing binarization for an image including only handwritten characters of the generated mixed image of handwritten characters and printed characters. The pixel value of the binary image is a label value indicating the pixel of a handwritten character and this is taken as supervised data. By using the learning data and the supervised data, learning of Deep Neural Network (DNN) configured to perform semantic segmentation is performed. In this manner, it is possible to generate a learning model capable of performing the area separation processing to separate an area into a handwritten area and a non-handwritten area.

In a case where the area separation processing is performed by using the learned model and taking a scanned image as an input, a label value is output, which indicates whether each pixel is a pixel of a handwritten character or a pixel of a non-handwritten character. Then, the pixels are separated in accordance with the label value and the area is separated into two areas: a handwritten area including only pixels of a handwritten character; and a non-handwritten area including printed characters, ruled lines, and frame lines.

FIG. 6D shows printed character arrangement information, which is results of performing the printed character area analysis for the image 620 of non-handwritten areas shown in FIG. 6B. "TEXT" 641 is information indicating the area in which a character string is arranged and indicated by a broken line. "LINE" 642 is information indicating the position at which a ruled line or a frame line is arranged and indicated by a thick line. Further, FIG. 6E shows handwritten character arrangement information, which is results of performing the handwritten ara analysis for the image 630 of handwritten areas shown in FIG. 6C. "HW TEXT" 651 is information indicating the area in which a handwritten character is arranged and indicated by a broken line. "CIRCLE" 652 is information indicating the area in which a circle is arranged and indicated by a broken line.

The printed character area analysis is explained in more detail. First, binarization is performed for the image including only non-handwritten areas obtained as results of the area separation processing. For the binarization results, contour tracking is performed and pixel blocks surrounded by the black pixel contour are extracted. Then, for the black pixel block whose area is larger than a predetermined area, the contour tracking is also performed for white pixels located inside the black pixel block and white pixel blocks are extracted, and the black pixel block is further extracted recursively from the inside of the white pixel block whose area is larger than or equal to a predetermined area. The black pixel block obtained as described above is determined to be a foreground area.

The determined foreground areas are classified according to size and shape into areas having different attributes. For example, the foreground area whose aspect ratio is close to 1 and whose size is included within a predetermined range is taken to be the pixel block corresponding to a character and further, the area in which the pixel blocks corresponding to a character in close proximity to one another are aligned and may be grouped is determined to be a printed character area (TEXT). The range occupied by the black pixel block including a flat pixel block and rectangular white pixel blocks whose size is larger than a predetermined size and which are aligned is determined to be a line area (LINE). In addition to this, it may also be possible to determine the area in which pixel blocks whose shapes are irregular are dispersed to be a photo area (PHOTO) and pixel blocks whose shapes are other than those described above as a picture area (PICTURE). In this manner, from among the areas into which divided for each object attribute, the foreground area (TEXT) determined to have the character attribute is detected as the printed character area.

Following the above, the handwritten area analysis is explained in detail. First, from among the handwritten areas obtained as results of the area separation, areas in close proximity to one another, whose distance between areas is less than or equal to a predetermined distance, are grouped together. It may also be possible to determine handwritten areas to be grouped together by utilizing not only the distance between handwritten areas but also the printed character arrangement information so that the handwritten areas grouped together do not cross the printed character area and the line area. From among the areas grouped together in this manner, the area including the character string area of the printed character arrangement information is determined to be a circle symbol (CIRCLE) and the rest of the areas are determined to be the handwritten text blocks (HW TEXT).

In order to increase the processing accuracy of the area separation and the character area analysis, it may also be possible to perform in advance inclination correction processing and rotation correction processing. In the inclination correction, first, the angle of the inclination of the scanned image is detected from the image data and the inclination of the scanned image is corrected by rotating the image in the opposite direction by the angle corresponding to the detected inclination. The inclination correction-target inclination occurs, for example, by the document not being read straight at the time of the scan of the document due to causes, such as the wear of the roller within the document feeder of the scanner 222 of the MFP 110. Alternatively, the inclination occurs by the scanned document not being printed straight in printing. As the method of detecting the angle of the inclination, there is a method in which, first, the objects included within the image data are detected and object groups adjacent to each other in the horizontal direction or the vertical direction are connected and then, the inclination is found by deriving how much the angle of the straight line connecting the center positions of the connected object groups is inclined from the horizontal direction or the vertical direction. The method of detecting the inclination is not limited to this method. In addition to this method, for example, a method may be acceptable in which center coordinates of the objects included within the image data are obtained and the center coordinates group are rotated in units of 0.1 degrees, and then, the angle that makes the highest the ratio of the center coordinates groups aligning in the horizontal direction or the vertical direction is found as the inclination of the scanned image.

The rotation correction is processing to rotate the image in units of 90 degrees so that the orientation of the character within the image is erect. As the rotation correction method, for example, there is a method in which four images, that is, the reference image, which is the scanned image whose inclination has been corrected, the image obtained by rotating the reference image by 90 degrees, the image obtained by rotating the reference image by 180 degrees, and the image obtained by rotating the reference image by 270 degrees are prepared and simple character recognition processing capable of fast processing is performed for each of the images, and then, the image whose number of characters recognized with a confidence score higher than or equal to a predetermined value is the largest is determined to be the image after the rotation correction. Note that, the rotation correction method is not limited to this method.

[Details of Character Recognition Processing]

Figure 7:
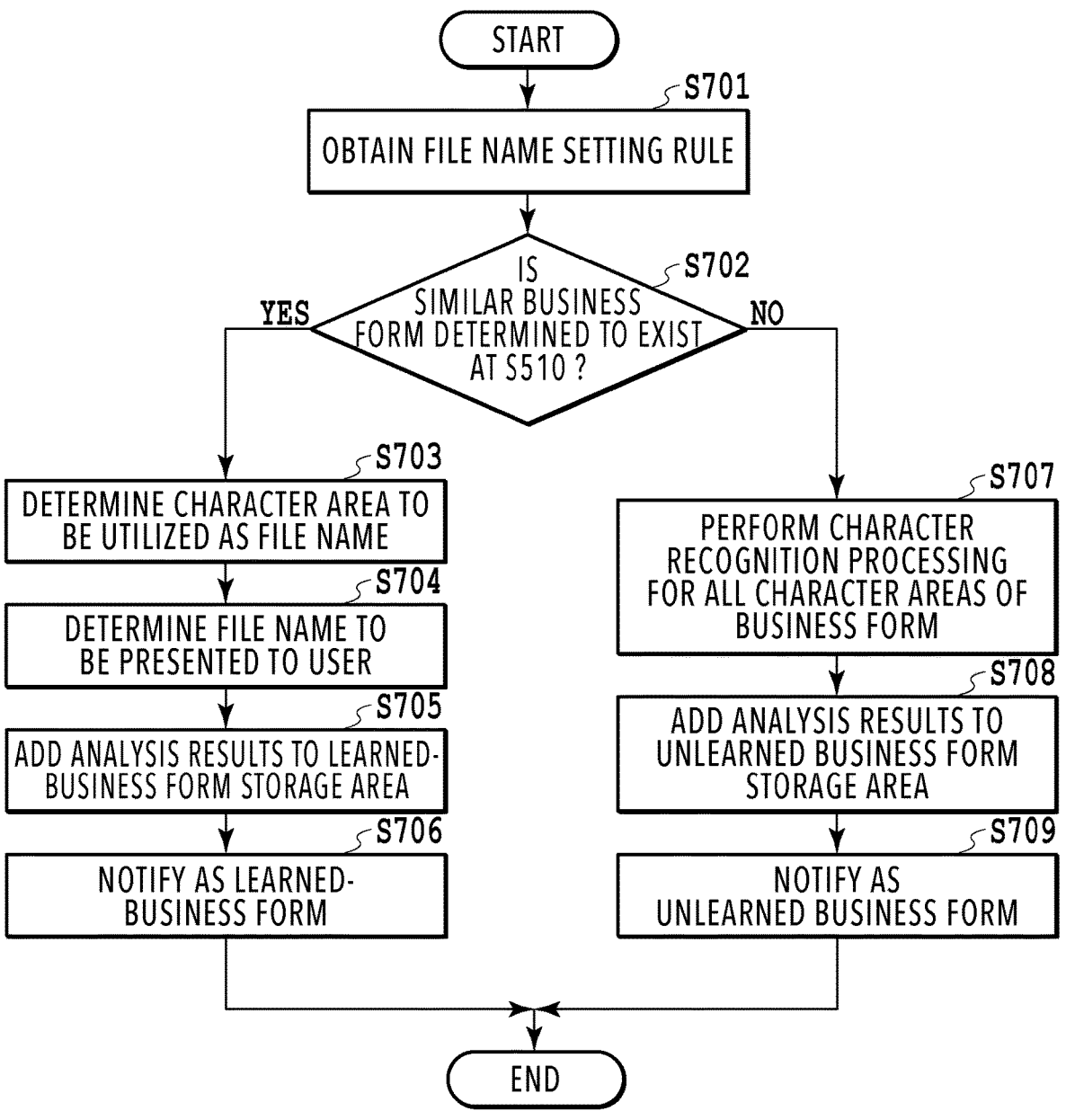
FIG. 7 is a flowchart showing a detailed flow of character recognition processing.

FIG. 7 is a flowchart showing a detailed flow of the character recognition processing (S511) that is performed by the image processing unit 432 of the MFP cooperative server 120.

At S701, the image processing unit 432 obtains the file name setting rule corresponding to the determination results of the similar business form determination (S510) from the data management unit 434. Specifically, in a case where the determination results that there is a similar business form are obtained by the similar business form determination (S510), the file name setting rule corresponding to the business form is obtained. In a case where the determination results that there is no similar business form are obtained, the common file name setting rule is obtained. Details of the file name setting rule will be described later by using FIG. 8A to FIG. 8D.

At S702, the image processing unit 432 determines whether the determination results that there exists a similar business form are obtained at S510. In a case where the image processing unit 432 obtains the determination results that there exists a similar business form are obtained (YES at S702), the processing is moved to S703. Further, in a case where the image processing unit 432 obtains the determination results that there exists no similar business form (NO at S702), the processing is moved to S707.

At S703, the image processing unit 432 determines the character string area (text block) that is utilized for the file name from the printed character arrangement information and the handwritten character arrangement information obtained at S509 based on the file name setting rule corresponding to the business form, which is obtained at S701. In a case where the text block is determined, the coordinates of the registered text block are utilized. Specifically, by using the coordinates of the registered text block as the registered file name setting rule, the text block whose overlapping ratio is higher than or equal to a predetermined value is selected.

At S704, the image processing unit 432 extracts a character string by performing character recognition processing for the text block determined at S703. At that time, the character recognition processing is performed by utilizing a character recognition engine for printed characters in a case where the target text block is a printed character text block, and by utilizing a recognition engine for handwritten characters in a case where the target text block is a handwritten text block. Then, the image processing unit 432 generates file name generation results based on the file name setting rule for each business form of the similar business form obtained at S701. An example of file name generation results will be explained by using FIG. 8D. By this processing, it is possible to present a file name having a strong possibility of being desired by a user in the target business form based on the file name setting rule of the similar business form. The number of text blocks to be utilized as a file name is not necessarily limited to one. In a case a plurality of text blocks is utilized as a file name, the processing at S703 and S704 described above is repeated the number of times corresponding to the number of text blocks.

At S705, the image processing unit 432 adds the character recognition results (file name generation results) obtained at S704 to the storage area of the learned business form. Then, at S706, the image processing unit 432 notifies the request control unit 431 of the character recognition results as the learned business form.

At S707, the image processing unit 432 extracts a character string by performing the character recognition processing for all the character areas (text blocks) of the business form. The reason the character recognition processing is performed for all the text blocks here is that it is determined that a similar business form does not exist and the area that is considered to be used for the file name setting is not known. In a case where the character recognition processing is performed for all the text blocks, based on each piece of arrangement information obtained by the character area analysis processing at S509, processing as shown below is performed. That is, in a case of a printed character text block, the character recognition processing is performed by utilizing the character recognition engine for printed characters. In a case of a handwritten text block, the character recognition processing is performed by utilizing the character recognition engine for handwritten characters. Then, based on the common file name setting rule obtained at S701, the image processing unit 432 generates the file name generation results. An example of the file name generation results will be explained by using FIG. 8C.

At S708, the image processing unit 432 adds the character recognition results obtained at S707 to the storage area of the unlearned business form. Then, at S709, the image processing unit 432 notifies the request control unit 431 of the character recognition results as the unlearned business form.

In a case where the processing at S706 or S709 is completed, the flow shown in FIG. 7 is terminated.

[Data Structure of File Name Setting Rule and File Name Generation Results]

FIG. 8A to FIG. 8D are each a diagram showing a data structure example of each piece of data managed in the data management unit 434.

FIG. 8A and FIG. 8B show a data structure example of the file name setting rule FIG. 8A shows a case of the common file name setting rule of the file name setting rule. The common file name setting rule is a rule for defining in advance the number of text blocks, the order of text blocks and the like, which are utilized as a file name irrespective of the format of the business form. In a case where an unlearned business form is determined in the similar business form determination at S510, initial file name generation results are generated in accordance with the common file name setting rule. It may also be possible to receive the common file name setting rule by preparing a dedicated UI for creation, or to import in advance from a file. FIG. 8B shows a case of the file name setting rule for each business form, which is stored by the input information storage processing at S518, of the file name setting rule. In a case where a learned business form is determined in the similar business form determination at S510, a file name is generated in accordance with the file name setting rule for each business form, which is associated with the relevant business form. The data structure may be common to the common file name setting rule and the file name setting rule for each business form.

Here, "formId" is a value for managing business form data. In "learningContent", details of the file name setting rule are set. In "metadataArray", information indicating the order of the item that is utilized as a file name and the delimiter character is set. In FIG. 8A and FIG. 8B, "title", "sep", "date", "sep", "name" are set. "rectInfoArray" has a text block group "regions" for each item that is utilized as a file name. The text block group "regions" is a value representing the position and attribute of the text block on the actual image. In the common file name setting rule, the text block group "regions" is blank and in the file name setting rule for each business form, information on the text block set for each business form is set. "rect" represents the position and size of the text block. Specifically, "x" indicates an X-coordinate of the top left of the text block (area), "y" indicates a Y-coordinate of the top left of the text block (area), "width" indicates the number of pixels in an X-direction of the text block (area), and "height" indicates the number of pixels in a Y-direction of the text block (area). There is a case where information on a plurality of text blocks is set for one item in the text block group "regions". For example, in a case where the text block at the portion at which handwritten figures are input is set in a date input field in which "year", "month, and "day" are printed in advance, six text blocks are set as indicated in the item of "date" in FIG. 8B.

FIG. 8C and FIG. 8D are each a diagram showing a data structure example of the file name generation results. FIG. 8C shows the file name generation results for an unlearned business form, which is generated at S706 described previously. FIG. 8D shows the position of the file name generation results in a case where the learned business form is determined, which are generated at S704 described previously. In "matched", a value is stored, which indicates whether a business form similar to the image scanned in the past (past scanned image) has been found for the analysis-target image by the similar business form determination. In "formId", in a case where there is a similar business form, a value uniquely indicating the business form is stored, and in a case where there is no similar business form, a value is stored, which is used to cause the input information on the image scanned at S516 to be learned. In "matchingScore", the degree of similarity is stored, which is obtained by the similar business form determination at S510 and which indicates to what extent the similar business form is similar in a case where the similar business form exists. The degree of similarity represents the degree of matching between the arrangement information on the image scanned in the past and the arrangement information on the image scanned this time by a real number value from 0 to 1, where the larger value indicates the more similar business form. The data structure of "recommendResult" is the structure determined based on "learningContent" of the file name setting rule and the data structure is the same. As shown in FIG. 8C, the text block group "regions" is blank for the item of the business form determined to be unlearned, or in a case where no corresponding text block is found at S703. On the other hand, as shown in FIG. 8D, in a case where the business form is determined to be learned and a corresponding text block is found at S703, in text block group "regions", information on the text block in the scanned image is stored. Further, in that case, different from "learningContent", information on "text" is set. This indicates the character string extracted as the results of performing the character recognition processing for the text of "rect". The character string obtained by combining "text" is taken to be the character string of each item and the character string obtained by combining the character string of each item in accordance with information indicating the order of the item and the delimiter character, which is stored in "metadataArray1", represents the generated file name.

[Storage Destination Setting Screen]

Figure 9:
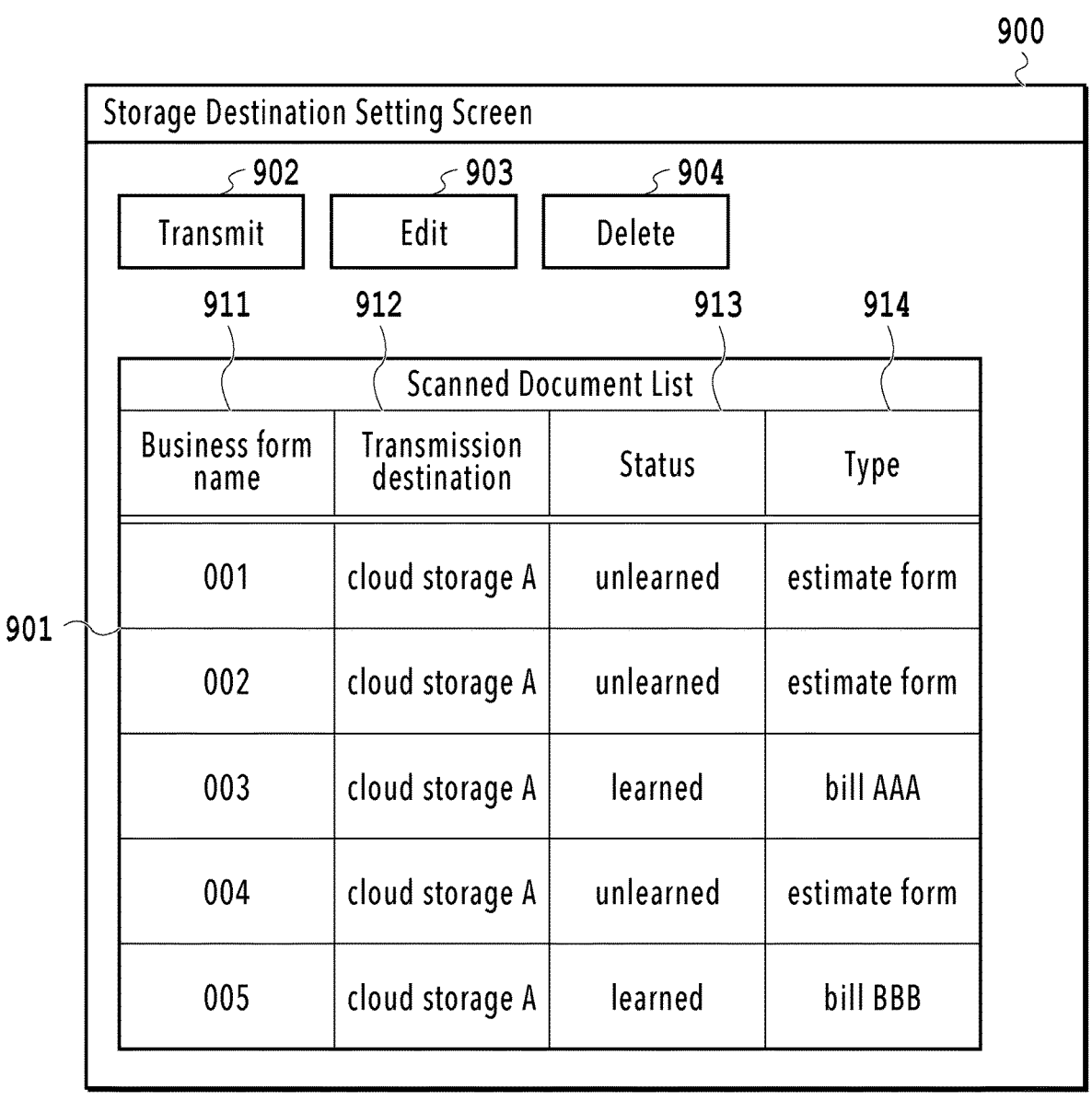
FIG. 9 is a diagram showing a storage destination setting screen example.

FIG. 9 is a diagram showing an example of Storage Destination Setting Screen 900 that is displayed by the MFP 110 or the client PC 111. On Storage Destination Setting Screen 900, it is possible to browse a list of scanned documents (business forms) before being transmitted to the storage server, for which the scan and the image analysis processing have been completed. Further, Storage Destination Setting Screen 900 includes a scanned document list (scanned business form list) 901, a "Transmit" button 902, an "Edit" button 903, and a "Delete" button 904. The scanned document list 901 displays a list of documents, such as business forms for which the scan and the image analysis (S505 to S511) have been completed.

In the scanned document list 901, information on each of Business form name 911, Transmission destination 912, Status 913, and Type 914 is displayed in a list for each scanned document.

In Business form name 911, an identifier uniquely identifying the name of a business form is displayed. In Transmission destination 912, the name of the storage server 130 is displayed, which is the transmission destination to which the file of a business form is transmitted. In Status 913, results in a case where the similar business form determination is performed for a business form are displayed and one of "unlearned" or "learned" is displayed. Here, "unlearned" indicates that a similar business form is determined not to exist and "learned" indicates that a similar business form is determined to exist. In Type 914, the type of business form is displayed. For example, "estimate form" or "bill" is displayed. Further, for the business form whose Status 913 is "learned", the detailed type, such as "bill AAA" and "bill BBB", which indicates to which bill format the bill corresponds, is displayed. This detailed type is associated with the most similar business form determined by the similar business form determination processing. The "Transmit" button 902 is a button for transmitting a business form to the storage server 130. By selecting an arbitrary business form from among a plurality of business forms displayed in the scanned document list 901 and pressing down the "Transmit" button 902 by a user operation, transmission to the storage server 130 displayed in Transmission destination 912 is performed. In a case where transmission is completed normally, the transmitted business form is deleted from the scanned document list 901. The "Edit" button 903 is a button for moving to a file name setting screen, to be described later. By selecting an arbitrary business form from among a plurality of business forms displayed in the scanned document list 901 and pressing down the "Edit" button 903 by a user operation, the display is switched to a File Name Setting screen 1000 of the selected business form. The "Delete" button 904 is a button for deleting a business form. By selecting an arbitrary business form from among a plurality of business forms displayed in the scanned document list 901 and pressing down the "Delete" button 904 by a user operation, the selected business form is deleted from the scanned document list 901.

[File Name Setting Screen]

FIG. 10A and FIG. 10B are each a diagram showing an example of a file name setting screen that is displayed by the MFP 110 or the client PC 111. FIG. 10A is a file name setting screen in a case where the input image is determined to be an unlearned business form at S510 and shows an example in which the file name setting screen is displayed based on the file name generation results shown in FIG. 8C. Further, FIG. 10B is a file name setting screen in a case where the input image is determined to be a learned business form at S510 and shows an example in which the file name setting screen is displayed based on the file name generation results shown in FIG. 8D.

The File Name Setting screen 1000 includes a preview area 1001, buttons 1002, 1003, and 1004, a text field 1005, an item setting area 1006, and the "Determine" button 1014.

In the preview area 1001, the scanned image (business form image) of an input document is displayed as a preview image. Further, in the preview area 1001, the rectangle indicating the position of the file name generation results and the text block determined by instructions of a user is highlighted on the scanned image in an overlapping manner. The buttons 1002 and 1003 are buttons enabling an increase and a reduction in the display magnification of a preview image. The button 1004 is a button enabling enlargement or reduction of a preview image so that the width or height of the preview image fits to the width or height of the preview area 1001. In the text field 1005, a file name is displayed based on the file name generation results obtained at S511. In the text field 1005, each time the text block designation reception processing for each of items 1007, 1008, and 1009 is completed, a character string that is displayed in a text field 1013 corresponding to each item is reflected and displayed. Further, in the text field 1005, each time the text field 1013 corresponding to each of the items 1007, 1008, and 1009 is edited directly, the character string that is displayed in the edited text field 1013 is reflected and displayed. The item setting area 1006 has the items 1007, 1008, and 1009. In each of the items 1007, 1008, and 1009, an item name 1010, a character type attribute 1011, a partial preview area 1012, and the text field 1013 are displayed based on the file name generation results obtained at S511. The partial preview area 1012 is an area in which the image corresponding to a text block is displayed, which is partially cut out from the scanned image. In the text field 1013, the character recognition results of a text block are displayed and in a case where the character recognition results are wrong, it is possible for a user to edit the character recognition results.

In a case where the business form is determined to be an unlearned business form at S510, or in a case where the corresponding text block is not found at S511, the file name setting screen is displayed in the state shown below. That is, as shown in FIG. 10A, in the partial preview area 1012, a message "Select from image" is displayed and the text field 1013 is displayed in the blank state.

In a case where the business form is determined to be an unlearned business form at S510, or in a case where the text block corresponding to the file name is not found at S511, it is possible to receive the designation of a text block by the user operation via the preview area 1001 for each item. The modification procedure in a case where the text block determined to be the text block corresponding to the file name at S511 is wrong is the same. Details of the text block designation reception processing will be described later by using FIG. 11. In accordance with the text block designated by a user, the partial preview area 1012 and the text field 1013 are updated.

In a case where a user completes check and modification and presses down the "Determine" button 1014, the scanned image is transmitted to the MFP cooperative server 120 along with the file name set on the file name setting screen and learning processing (S516 to S518) is performed. In a case where transmission is completed, the display returns to Storage Destination Setting Screen 900.

[Text Block Designation Reception Processing]

FIG. 11 is a flowchart showing a flow of the text block designation reception processing in the present embodiment. The processing in FIG. 11 is performed in the MFP 110 or the client PC 111. FIG. 12A to FIG. 12F are diagrams for explaining the text block designation reception processing. In FIG. 12A to FIG. 12F, the item of "name" in FIG. 10A is shown as an example.

Figures 12A, 12B, 12C, 12D, 12E, 12F:
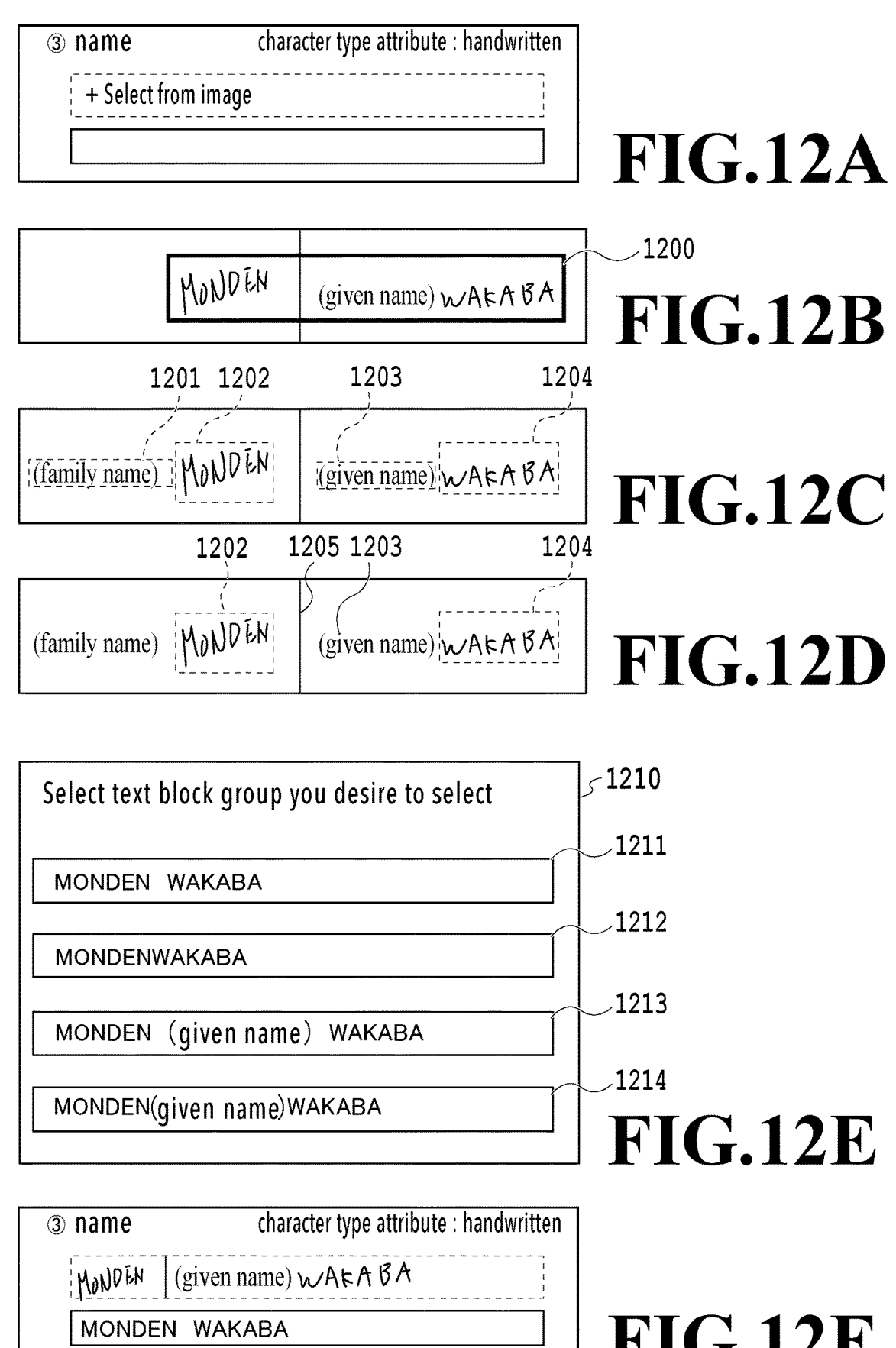
FIG. 12A to FIG. 12F are diagrams for explaining the text block designation reception processing.

At S1101, the user operation to select one item from among a plurality of items in the item setting area 1006 is received. FIG. 12A shows the item area in the state where no text block is selected yet.

At S1102, on the preview area 1001, the user operation to designate a range for one or more text blocks is received. For example, it is sufficient to receive the user operation to select coordinates of two points on the preview area and take the rectangle whose diagonal connects the received coordinates of the two points as a range, and then, obtain the text block group whose center of the rectangle is included in the range. Here, the text block group is the text block group obtained by the series of processing at S508, S509, and S511. The range designated by the user operation is a rectangle 1200 indicated by the solid line as shown in FIG. 12B. Further, FIG. 12C shows the text block group including a plurality of text blocks 1201 to 1204 located within and around the rectangle 1200. The text blocks 1201 and 1203 are printed character text blocks and the text blocks 1202 and 1204 are handwritten character text blocks (also referred to as handwritten text blocks). In a case where the range indicated by the rectangle 1200 is received by the user operation, among the text blocks 1201 to 1204, the three text blocks 1202, 1203, and 1204 whose centers are included inside the rectangle 1200 are obtained. The method of designating the range is not limited to the above-described method and it may also be possible to obtain the text block group that overlaps the range outlined by the mouse drag or the swipe operation on the image.

At S1103, whether or not the printed character text block and the handwritten text block exist in a mixed state within the range designated at S1102 is determined. In a case where the determination results indicating the mixed state are obtained (YES at S1103), the processing is moved to S1104. In a case where the determination results indicating the unmixed state are obtained (NO at S1103), the processing is moved to S1105. For example, in a case where the range indicated by the rectangle 1200 as in FIG. 12B is designated, the printed character text block 1203 and the handwritten text blocks 1202 and 1204 exist in the mixed state, and therefore, the processing is moved to S1104.

At S1104, the character string in the printed character text block existing within the range designated at S1102 is set as the non-combining target. For example, in a case where the range indicated by the rectangle 1200 is designated as in FIG. 12B, the character string within the printed character text block 1203 is set as the non-combining target and as in FIG. 12D, only the handwritten text blocks 1202 and 1204 are set as the combining targets.

At S1105, based on the portions at which the frame line, the ruled line, and the non-combining-target character string exist, which exist within the range designated at S1102, the position at which a space is inserted is determined, which is the predetermined delimiter character. The predetermined delimiter character is not limited to a space and the predetermined delimiter character may be an underscore, hyphen and the like. For example, in a case where FIG. 12D is taken as an example, between the handwritten text blocks 1202 and 1204, the non-combining-target text block 1203 and a frame line 1205 exist, and therefore, it is determined that a space is inserted at this position. It is assumed that even in a case where a plurality of frame lines, ruled lines, and non-combining-target character strings exists between the combining-target text blocks, the only one space is inserted. For example, in a case where FIG. 12D is taken as an example, even though two objects, that is, the non-combining-target text block 1203 and the frame line 1205 exist between the handwritten text blocks 1202 and 1204, the only one space is inserted at this position. In a case where the designated range (area) includes a printed character text block existing at a portion other than the portion between two handwritten text blocks, the printed character of the character recognition results in this printed character text block is deleted and not taken into consideration in determining the predetermined delimiter character insertion position.

At S1106, the character strings within the combining-target text blocks are combined and a single continuous character string is created. Note that a space is inserted at the position determined at S1105. For example, in FIG. 12D, in the state where a space is inserted between the character strings, the character string "MONDEN" within the handwritten text block 1202 and the character string "WAKABA" within the handwritten text block 1204 are combined and a single continuous character string "MONDEN WAKABA" is created.

At S1107, candidates of the character string combining results in a case where the text blocks existing within the range designated at S1102 are combined are presented to a user. That is, by using the character recognition results of the handwritten and printed character text blocks existing within the designated range and the predetermined delimiter character, combining is performed in accordance with predetermined conditions and a plurality of single continuous character strings of a plurality of patterns is created as candidates of the combining results. Then, the candidates of the combining results of the created character stings of a plurality of patterns are presented to a user. As the candidates, character strings are presented, which take into consideration the combination of whether or not to insert a space between character strings and whether or not to add a printed character text block to the combining target, in addition to the character string created at S1106. For example, on a screen 1210 as in FIG. 12E, a character string "MONDEN WAKABA" 1211, a character string "MONDEN-WAKABA" 1212, a character string "MONDEN (given name) WAKABA" 1213, and a character string "MONDEN (given name) WAKABA" 1214 are presented as candidates. The character string "MONDEN WAKABA" 1211 is an example of the character string created at S1106. The character string "MONDENWAKABA" 1212 is an example of the character string into which no space is inserted between the character strings. The character string "MONDEN (given name) WAKABA" 1213 is an example of the character string in which the printed character is taken as the combining target. The character string "MONDEN (given name) WAKABA" 1214 is an example of the character string into which no space is inserted between the character strings and the printed character is taken as the combining target. At this time, it may also be possible to highlight and present the character string created at S1106 so that the character string is conspicuous, such as displaying the character string created at S1106 at the uppermost position among all the candidates of the character string.

At S1108, the user operation to select the character string from among the candidates presented at S1107 is received.

In FIG. 12E, though the example is shown in which the candidate character strings are displayed en bloc on the screen and the one character string is selected therefrom, the method of presenting candidate character strings and the method of receiving selection are not limited to the methods described above. For example, a method or the like may be acceptable in which in a case where a range is designated by dragging a mouse, candidate character strings to be displayed are switched in accordance with the time during which the left click button is pressed down in the state where the range is selected and the character string that is displayed at the instant at which the pressing down of the left click button is terminated is selected.

Further, it may also be possible to adopt the character string created at S1106 as it is and set as the character string combining results without performing S1107 or S1108.

At S1109, by using the preview image and the combining-target text block group, a partial preview image is created and the partial preview area 1012 is updated. For example, it may be possible to create a partial preview image by cutting out the image corresponding to the range from the preview image, which is the circumscribed rectangle surrounding the combining-target text block group to which a predetermined amount of margin is attached. In FIG. 12F, the partial preview area is updated and the image indicated by the rectangle 1200 is displayed in the partial preview area as the partial preview image.

At S1110, by using the character string selected at S1108, or the character string obtained at S1106 in a case where S1107 and S1108 are not performed, the text field 1013 of the item is updated. In FIG. 12F, the text field is updated and the single continuous character string "MONDEN WAKABA" indicated by the character string "MONDEN WAKABA" 1211 is displayed in the text field as the character recognition results of the text block.

The above is the contents of the file name generation processing. In the present embodiment, though the scene is explained as an example in which the file name is set by using the character recognition results of the character string area within the scanned image, the application range of the present invention is not limited to the scene in which the file name is set. For example, it may also be possible to apply the present invention to the transfer destination setting of data, such as the upload destination of the scanned image, or the destination setting of FAX transmission or mail transmission. In this case, for example, on an upload setting screen, the character recognition results of the character string area within the scanned image are displayed as folder path candidates in such a manner that the candidates can be selected and it is made possible to set a path name in accordance with user selection. Further, on a destination setting screen, not shown schematically, the character recognition results of the character string area within the scanned image are displayed as FAX number or mail address candidates in such a manner that the candidates can be selected and it is made possible to set a FAX number or mail address in accordance with user selection. As described above, it is possible to apply the present invention widely in the scene in which setting of various types of information (incidental information) relating to the scanned image is performed, for example, such as setting of the transfer destination of data, other than the scene of file name setting.

As explained above, even in a case where a plurality of handwritten characters is included within the character area designated by a user and a printed character or an object other than character (frame line or ruled line) exists between the plurality of handwritten characters, it is made possible to obtain a single continuous character string desired by a user.

Second Embodiment

In the first embodiment, the aspect is explained in which the printed character text block is always taken as the non-combining target in a case where the printed character text block and the handwritten text block exist in the mixed state. Note that there is a case where it is desired to obtain a single continuous character string by combining printed character text and handwritten text without taking the printed character text block as the non-combining target on a condition that the size of the printed character text block and the size of the handwritten text block are substantially the same. Consequently, an aspect is explained as a second embodiment in which whether or not to take a printed character block as the combining target is determined for each printed character block by comparing the length in the vertical direction of the printed character text block with that of the handwritten text block. The contents common to those of the first embodiment are omitted and in the following, points different from those of the first embodiment are explained mainly.

[Text Block Designation Reception Processing]

Figure 13:
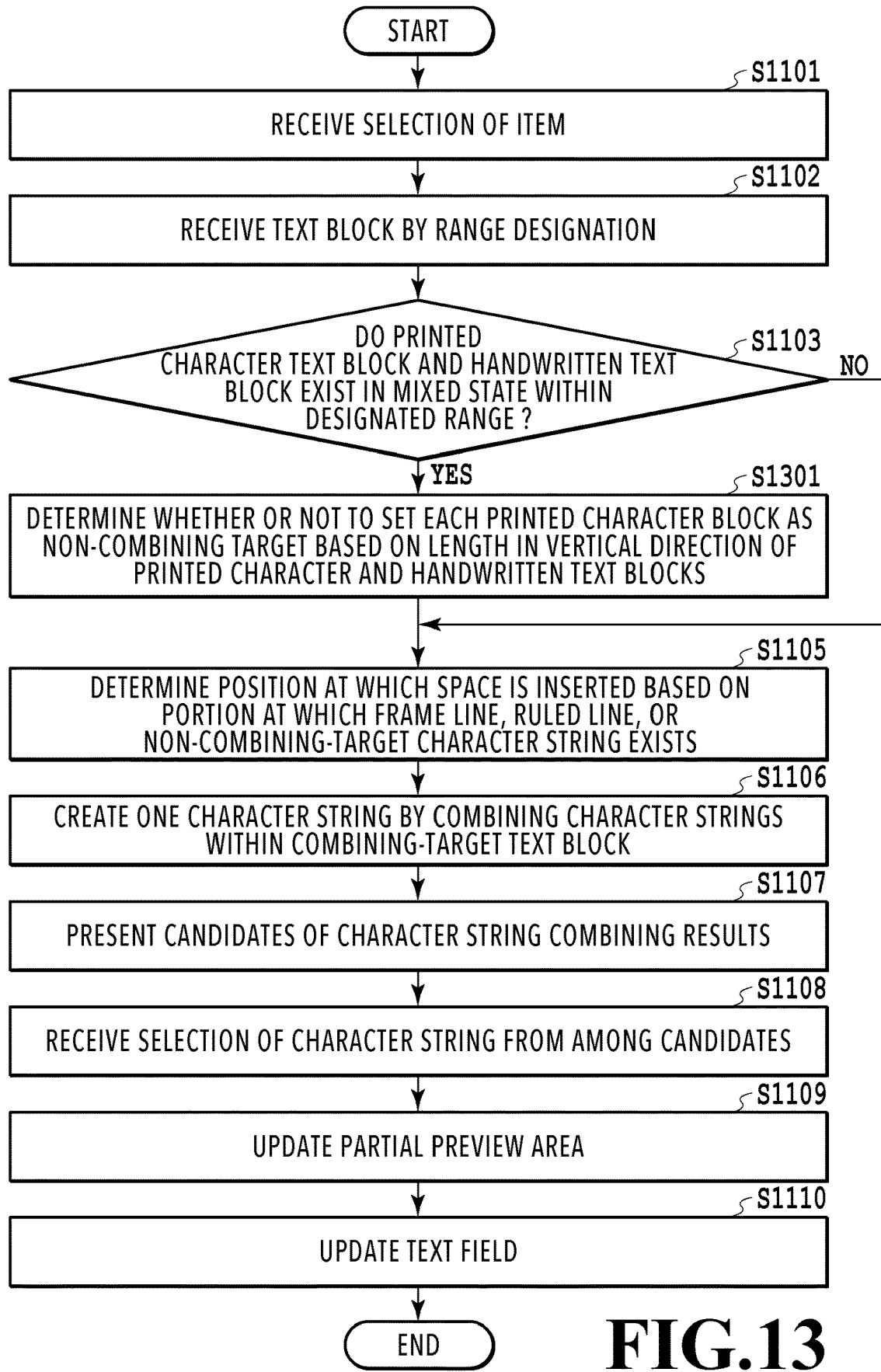
FIG. 13 is a flowchart showing a detailed flow of the text block designation reception processing.
Figure 15A:
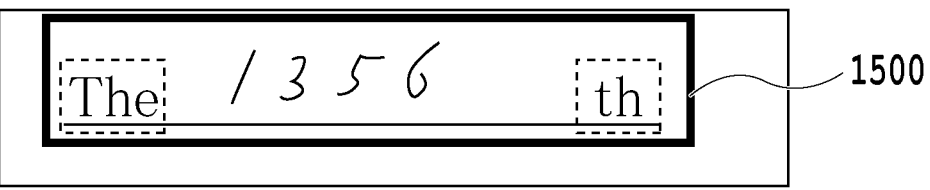
FIG. 15A and FIG. 15B are each a diagram for explaining a text block designation reception example.
Figure 15B:
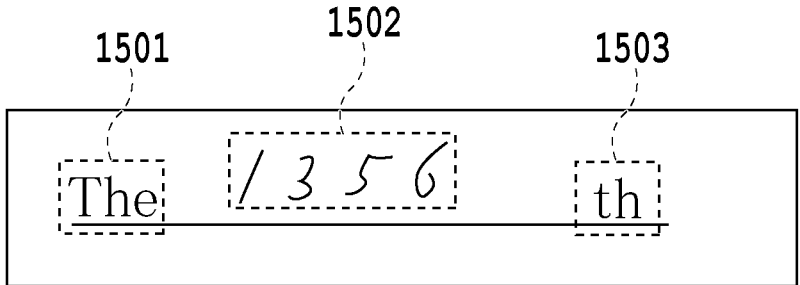

FIG. 13 is a flowchart showing a flow of the text block designation reception processing in the present embodiment. The processing in FIG. 13 is performed in the MFP 110 or the client PC 111. In a case where the determination results indicating true are obtained in the processing at S1103 (YES at S1103), the processing is moved to S1301. FIG. 15A and FIG. 15B are each a diagram for explaining a text block designation reception example.

At S1301, for the text blocks existing within the range designated at S1102, whether or not to take the printed character block as the non-combining target is determined for each printed character block based on the length in the vertical direction of the printed character text block and that of the handwritten text block. Details of the processing are explained by using FIG. 14.

Figure 14:
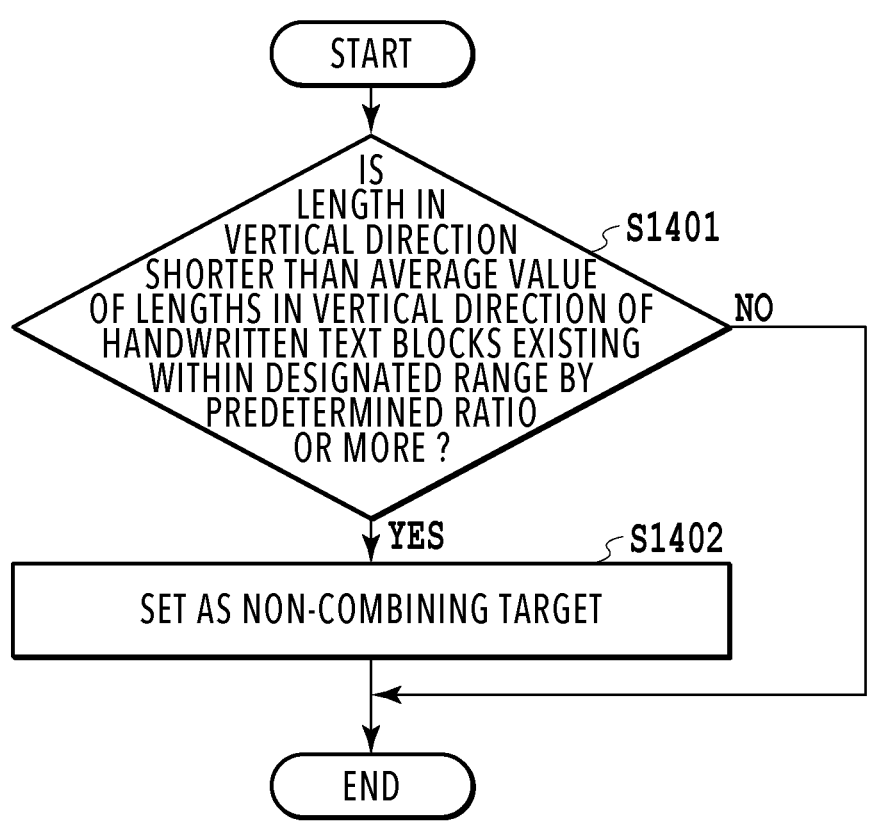
FIG. 14 is a flowchart showing a detailed flow of processing to determine whether or not to set a printed character block to a non-combining target for each printed character block.

FIG. 14 is a flowchart showing a detailed flow of non-combining target determination processing (S1301). Note that the processing at S1401 and S1402 in FIG. 14 is performed for each printed character text block existing within the range designated at S1102.

At S1401, for the processing-target printed character text block, whether or not the length in the vertical direction is shorter than the average value of the lengths in the vertical direction of the handwritten text blocks existing within the range designated at S1102 by a predetermined ratio or more is determined. In a case where the determination results that the length is shorter than the average value by the predetermined ratio or more are obtained (YES at S1401), the processing is moved to S1402. In a case where the determination results that the length is not shorter than the average value by the predetermined ratio or more are obtained (NO at S1401), the processing at S1402 is skipped and the flow shown in FIG. 14 is terminated. Note that whether or not the length is smaller than the average value by the predetermined ratio or more is determined by whether or not a predetermined condition determined in advance is satisfied, such as "shorter than or equal to the average value of the lengths in the vertical direction of the handwritten text blocks×0.8". Here, as an example, a case is explained where the range indicated by a rectangle 1500 in FIG. 15A is designated. Here, it is assumed that the length in the vertical direction of printed character text blocks 1501 and 1503 is 20 pixels and the length in the vertical direction of a handwritten text block 1502 is 24 pixels. In this case, as the handwritten text block, only the handwritten text block 1502 exists, and therefore, the average value of the length in the vertical direction of the handwritten text block 1502 is 24 pixels. In this case, the length, which is 20 pixels, in the vertical direction of the printed character text blocks 1501 and 1503 is longer than 24 pixels×0.8=19.2 pixels. Consequently, the processing at S1402 is skipped and the flow shown in FIG. 14 is terminated and the printed character text blocks 1501 and 1503 are not set as the non-combining target. That is, it can be said that in a case where the determination results that the length is not shorter than the average value by the predetermined ratio or more are obtained (NO at S1401), the printed character of the character recognition results in the determination-target printed character text block is set as the combining target.

At S1402, the processing-target printed character text block is set as the non-combining target. In a case where the processing at S1402 is completed, the flow shown in FIG. 14 is terminated.

As explained above, it is possible to obtain a single continuous character string desired by a user in accordance with the results of comparing the length in the vertical direction of the printed character text block with that of the handwritten text block. That is, in accordance with the comparison results, it is possible to obtain a single continuous character string with the character recognition results of the handwritten character block being taken as the combining target or the non-combining target.

Third Embodiment

In the second embodiment, the aspect is explained in which whether or not to take the printed character text block as the combining target is determined for each printed character text block by comparing the length in the vertical direction of the printed character text block with that of the handwritten text block. Note that in a case where the combined character string has a specific format, such as "**yearmonth**day", it may happen that it is desired to take the printed character text block as the combining target irrespective of the length in the vertical direction of the block. Consequently, an aspect is explained as a third embodiment in which whether or not to take a printed character text block as the combining target is switched in accordance with whether or not the combined character string has a specific format. The contents common to those of the first embodiment are omitted and in the following, points different from those of the first embodiment are explained mainly.

[Text Block Designation Reception Processing]

Figure 16:
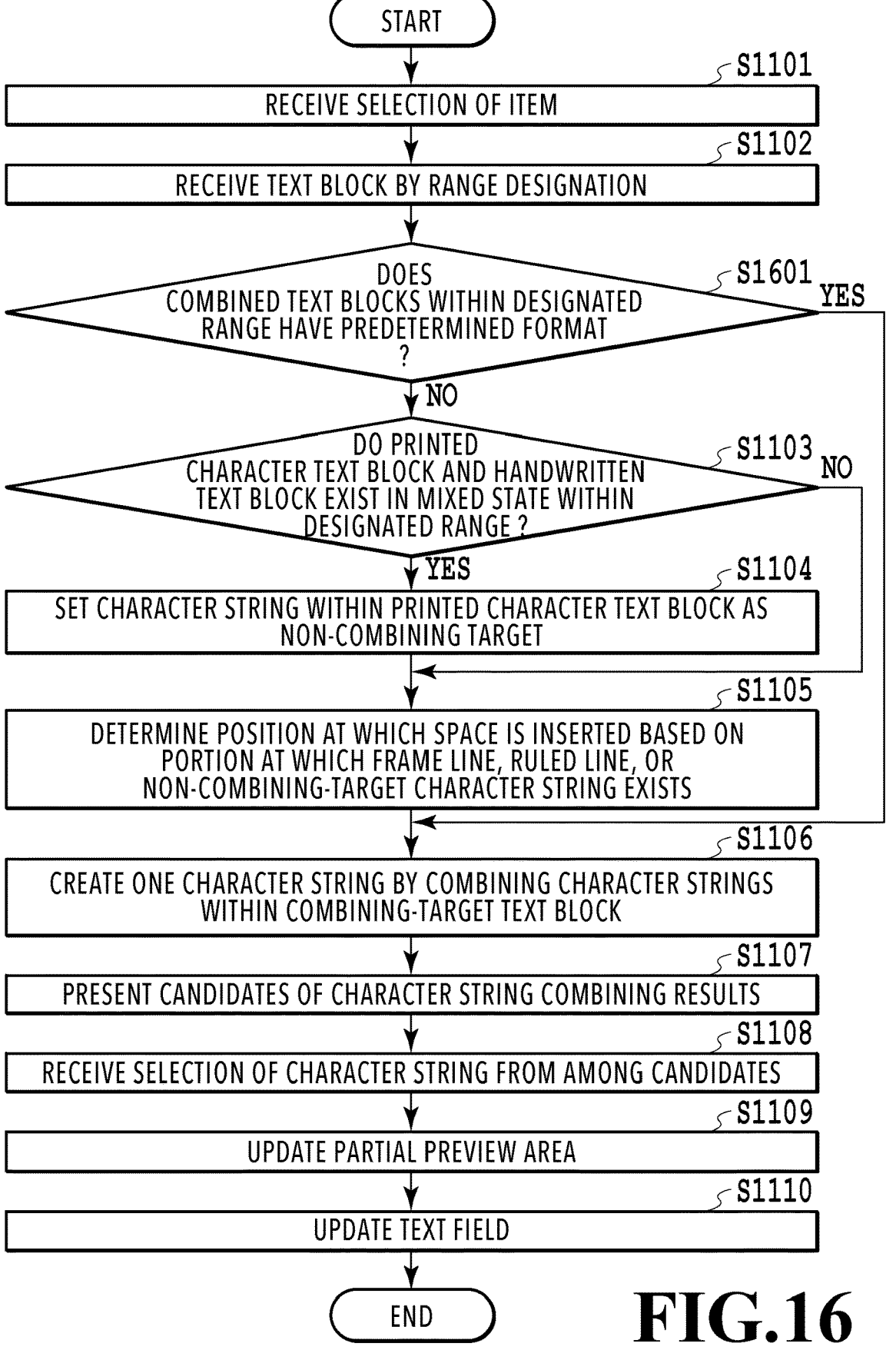
FIG. 16 is a flowchart showing a detailed flow of the text block designation reception processing.

FIG. 16 is a flowchart showing a flow of the text block designation reception processing in the present embodiment. The processing in FIG. 16 is performed by the MFP 110 or the client PC 111. In a case where the processing at S1102 is completed, the processing is moved to S1601.

Figure 17A:
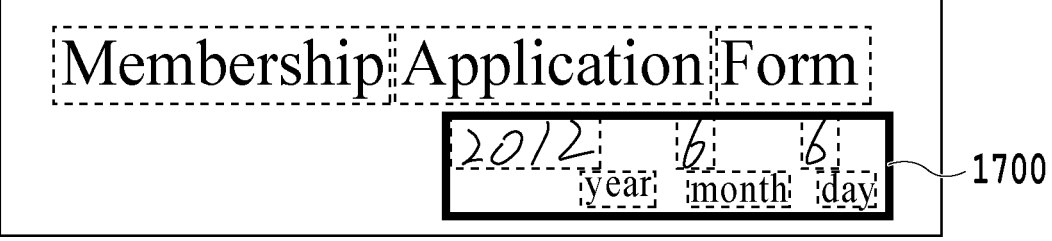
FIG. 17A and FIG. 17B are each a diagram for explaining a text block designation reception example.
Figure 17B:
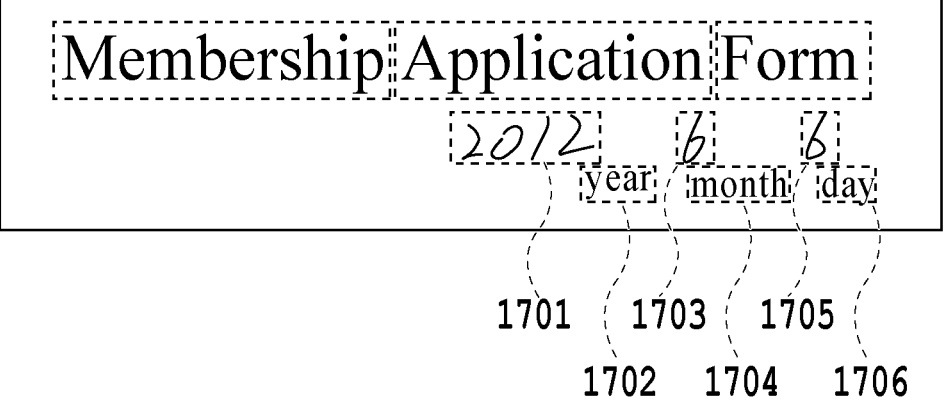

At S1601, whether or not the combined character string has a predetermined format in a case where the text blocks existing within the range designated at S1102 are combined is determined. In a case where the determination results that the combined character string has a predetermined format are obtained (NO at S1601), the processing is moved to S1103. In a case where the determination results that the combined character string does not have a predetermined format are obtained (YES at S1601), the processing is moved to S1106. The predetermined format is a format that is represented by a regular representation, for example, such as "****year*month*day", "**yearmonth day", and "**//". For example, in a case where the range indicated by a rectangle 1700 in FIG. 17A is designated, by combining character strings within text blocks 1701, 1702, 1703, 1704, 1705, and 1706, "2012 year 6 month 6 day" is obtained. This format matches the format of "**year*month*day", and therefore, the processing at S1103, S1104, and S1105 is skipped and the processing is moved to S1106. In a case where the combined character string has the predetermined format by performing the determination processing such as this, it can be said that the printed character of the character recognition results in the printed character text block is set as the combining target.

As explained above, it is made possible to obtain a single continuous character string combining the character recognition results of the printed character blocks in accordance with the determination results by determining whether the combined character string has a specific format.

Fourth Embodiment

In the first embodiment, the aspect is explained in which in a case where a frame line, a ruled line, or a non-combining-target character string exists between the combining-target character strings, a space is always inserted between the combining-target character strings. Note that, there is a case where it is desired to switch between inserting a space and not inserting a space in accordance with the type of character configuring a character string. For example, even though the language is the same, it is considered that in a case where "MONDEN (Alphabetic characters)" and "WAKABA (Alphabetic characters)" are combined, it is desired to insert a space and in a case where "MONDEN (Japanese characters)" and "WAKABA (Japanese characters)" are combined, it is not desired to insert a space. Consequently, an aspect is explained as a fourth embodiment in which whether or not to insert a space is determined based on the character code of the character strings within the combining-target text blocks existing before and after the portion at which a frame line, a ruled line, or a non-combining-target character string exists for each portion. The contents common to those of the first embodiment are omitted and in the following, points different from those of the first embodiment are explained mainly.

[Text Block Designation Reception Processing]

FIG. 18 is a flowchart showing a flow of the text block designation reception processing in the present embodiment. The processing in FIG. 18 is performed in the MFP 110 or the client PC 111. In a case where the processing at S1104 is completed, or in a case where the determination results indicating false in the processing at S1103 are obtained, the processing is moved to S1801.

At S1801, for each portion at which a frame line, a ruled line, or a non-combining-target character string exists, based on the character code of the character strings within the combining-target text blocks existing before and after the portion, whether or not to insert a space is determined. Details of the processing are explained by using FIG. 19.

Figure 19:
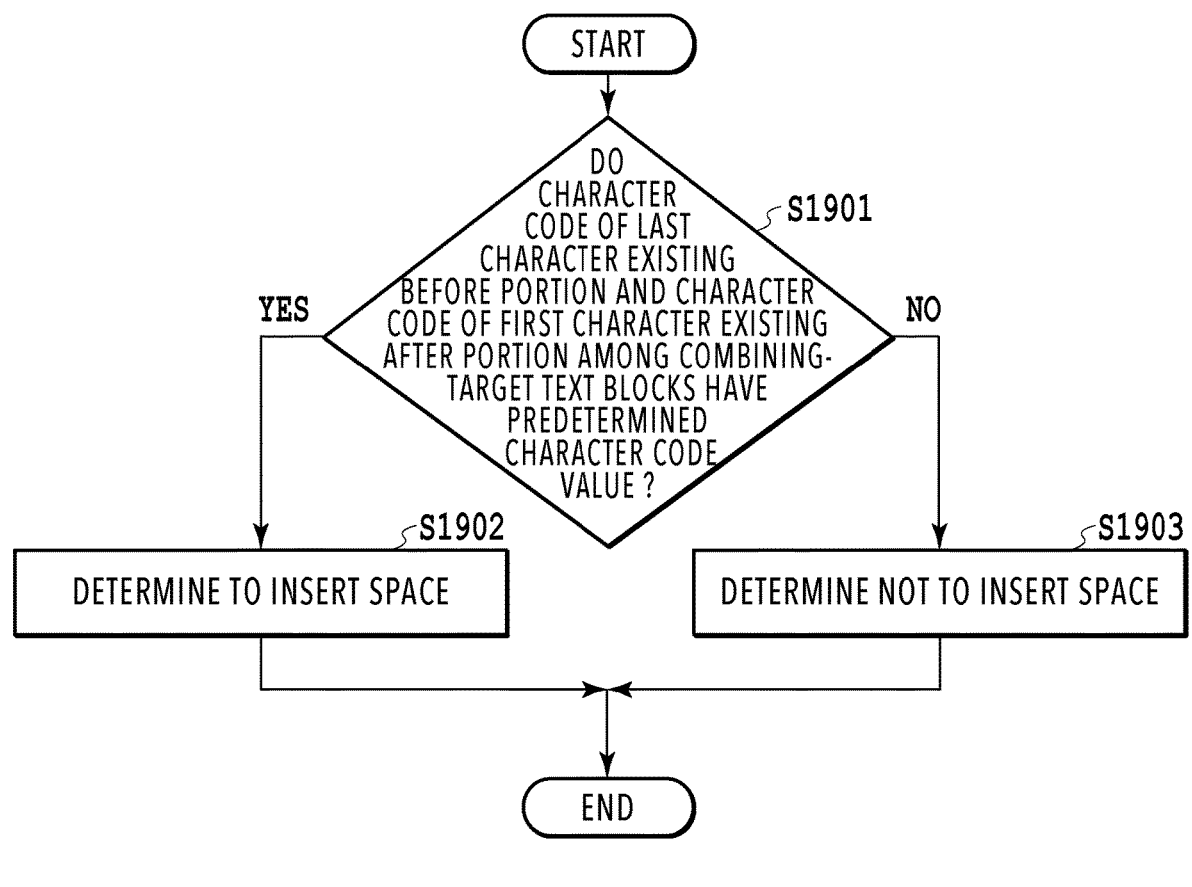
FIG. 19 is a flowchart showing a detailed flow of processing to determine whether or not to insert a space for a portion at which a frame line, a ruled line, or a non-combining-target character string exists.

FIG. 19 is a flowchart showing a detailed flow of space insertion determination processing (S1801). Note that the processing at S1901, S1902, and S1903 in FIG. 19 is performed for each portion at which a frame line, a ruled line, or a non-combining-target character string exists between combining-target text blocks.

At S1901, whether or not the character code of predetermined characters of character strings of the character recognition results in the text blocks existing before and after the portion among the combining-target text blocks has a predetermined character code value is determined. That is, whether the character code of the last character of the character string of the character recognition results of the text block existing before the portion has a predetermined character code value and the character code of the first character of the character string of the character recognition results of the text block existing after the portion has a predetermined character code value is determined. In a case where the determination results that the character code has a predetermined character code value are obtained (YES at S1901), the processing is moved to S1902. In a case where the determination results that the character code does not have a predetermined character code value are obtained (NO at S1901), the processing is moved to S1903. As the character code, for example, though Unicode is used, this is not limited and it may also be possible to use character code other than that used at S1901.

For example, in a case where the range indicated by a rectangle 2000 in FIG. 20A is designated, handwritten text blocks 2001 and 2003 are taken as combining-target text blocks and whether or not to take a frame line 2002 existing between the text blocks as the combining target is determined. Whether or not the character code of the last character "N" of the handwritten text block 2001 existing before the frame line 2002 and the character code of the first character "W" of the handwritten text block 2003 existing after the frame line 2002 are the predetermined character code value is determined. For example, in a case where the character code corresponding to alphabet is included as the predetermined character code value, the processing is moved to S1902.

Further, as another example, in a case where the range indicated by a rectangle 2004 in FIG. 20C is designated, handwritten text blocks 2005 and 2007 in FIG. 20D are taken as combining-target text blocks and whether a frame line 2006 existing between the text blocks is taken as the combining target is determined. Whether or not the last character "DEN (Japanese character)" of the handwritten text block 2005 existing before the frame line 2006 and the first character "WAKA (Japanese character)" of the handwritten text block 2007 existing after the frame line 2006 are a predetermined character code value is determined. For example, in a case where the character code corresponding to Japanese character is not included as the predetermined character code value, the processing is moved to S1903.

At S1902, it is determined that a space (predetermined delimiter character) is inserted at the portion of interest. In the example in FIG. 20B, it is determined that a space is inserted between the character string "MONDEN" of the handwritten text block before the frame line 2002 and the character string "WAKABA" of the handwritten text block after the frame line 2002.

At S1903, it is determined that a space (predetermined delimiter character) is not inserted at the portion of interest. In the example in FIG. 20D, it is determined that a space is not inserted between "MONDEN (Japanese characters)" of the handwritten text block before the frame line 2006 and the character string "WAKABA (Japanese characters)" of the handwritten text block after the frame line 2006.

As explained above, it is possible to obtain a single continuous character string into which a space is inserted or a single continuous character string into which no space is inserted based on the character code of the character strings of the combining-target text blocks before and after the portion at which a frame line, a ruled line, or a non-combining-target character string exists.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to obtain a single continuous character string desired by a user by using character recognition results of a scanned image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-198880, filed Dec. 13, 2022, which is hereby incorporated by reference wherein in its entirety.

What is claimed is:

1. An image processing apparatus comprising:
a controller including a processor and a memory, configured to:
obtain a scanned image by scanning a document including a plurality of strings of handwritten characters and a string of printed characters;
obtain character recognition results for a plurality of handwritten character blocks corresponding to the plurality of strings of handwritten characters included in the scanned image, character recognition results for a printed character block corresponding to the string of printed characters included in the scanned image, and an object other than characters included in the scanned image;
display the scanned image on a UI screen for a user to designate a character area in the scanned image; and
in a case where the character area designated by the user includes: (i) the plurality of strings of handwritten characters and (ii) the string of printed characters or the object exists between the plurality of strings of handwritten characters:
insert a predetermined delimiter character in place of the string of printed characters or the object existing between the plurality of strings of handwritten characters; and
display on the UI screen a first single continuous character string combining the character recognition results for the plurality of handwritten character blocks corresponding to the plurality of strings of handwritten characters and the predetermined delimiter character between the plurality of handwritten character blocks.

2. The image processing apparatus according to claim 1, wherein:
the controller is configured to further display on the UI screen:
a second single continuous character string combining only the character recognition results for the plurality of handwritten character blocks corresponding to the plurality of strings of handwritten characters by deleting the string of printed characters and the object;
a third single continuous character string combining the character recognition results for the plurality of handwritten character blocks corresponding to the plurality of strings of handwritten characters and the character recognition results for the printed character block corresponding to the string of printed characters by inserting the predetermined delimiter character in place of the object; and
a fourth single continuous character string combining the character recognition results for the plurality of handwritten character blocks corresponding to the plurality of strings of handwritten characters and the character recognition results for the printed character block corresponding to the string of printed characters by deleting the object; and

one of the displayed first single continuous character string, the displayed second single continuous character string, the displayed third single continuous character string, or the displayed fourth single continuous character string is selectable by the user.

3. The image processing apparatus according to claim 1, wherein the controller is further configured to:
determine whether or not the character recognition results for the printed character block is a combining-target character string based on sizes of the plurality of handwritten character blocks corresponding to the plurality of strings of handwritten characters; and
display, on the UI screen, a second single continuous character string combining the character recognition results for the plurality of handwritten character blocks corresponding to the plurality of strings of handwritten characters and the character recognition results for the printed character block without inserting the predetermined delimiter character, in response to the character recognition results being the combining-target character string.

4. The image processing apparatus according to claim 1, wherein the controller is further configured to:
determine, in a case where a length in a vertical direction of the printed character block corresponding to the string of printed characters existing between the plurality of strings of handwritten characters is not smaller than an average value of lengths in a vertical direction of the plurality of handwritten character blocks corresponding to the plurality of strings of handwritten characters by a predetermined ratio or more, that the character recognition results for the printed character block is the combining-target character string; and
display, on the UI screen, a second single continuous character string combining the character recognition results for the plurality of handwritten character blocks corresponding to the plurality of strings of handwritten characters and the character recognition results for the printed character block without inserting the predetermined delimiter character, in response to the character recognition results being the combining-target character string.

5. The image processing apparatus according to claim 1, wherein the controller is further configured to:
display on the UI screen, in a case where a second single continuous character string combining the character recognition results for the plurality of handwritten character blocks corresponding to the plurality of strings of handwritten characters and the character recognition results for the printed character block corresponding to the string of printed characters existing between the plurality of strings of handwritten characters has a predetermined format, the second single continuous character string without inserting the predetermined delimiter character.

6. The image processing apparatus according to claim 5, wherein the controller is further configured to:
determine whether or not to insert the predetermined delimiter character based on a character code of the handwritten characters adjacent before and after the string of printed characters existing between the plurality of string of handwritten characters; and
display on the UI screen the second single continuous character string in accordance with the determination.

7. The image processing apparatus according to claim 6, wherein the controller is further configured to:

display on the UI screen, in a case where a character code of a last handwritten character of one of the plurality of strings of handwritten characters, which is adjacent before the string of printed characters existing between the plurality of strings of handwritten characters, and a character code of a first handwritten character of one of the plurality of strings of handwritten characters, which is adjacent after the string of printed characters existing between the plurality of strings of handwritten characters is a predetermined character code, the second single continuous character string with the predetermined delimiter character inserted in place of the string of printed characters existing between the plurality of strings of handwritten characters.

8. The image processing apparatus according to claim 6, wherein the controller is further configured to:

display on the UI screen, in a case where a character code of a last handwritten character of one of the plurality of strings of handwritten characters, which is adjacent before the string of printed characters existing between the plurality of strings of handwritten characters, and a character code of a first handwritten character of one of the plurality of strings of handwritten characters, which is adjacent after the string of printed characters existing between the plurality of strings of handwritten characters is not a predetermined character code, the second single continuous character string with the string of printed characters existing between the plurality of strings of handwritten characters deleted without inserting the predetermined delimiter character.

9. The image processing apparatus according to claim 1, wherein the controller is further configured to:

receive designation of an item by a user operation; and display, on the UI screen, a second single continuous character string on the UI screen, which is generated based on the character recognition results for the plurality of handwritten character blocks and the printed character block, respectively, which correspond to the designated item.

10. The image processing apparatus according to claim 1, wherein the controller is further configured to:

register arrangement information on the plurality of handwritten character blocks and the printed character block corresponding to the plurality of strings of handwritten characters and the string of printed characters, respectively, which are included in the scanned image, and the character recognition results for the plurality of handwritten character blocks and the character recognition results for the printed character block, respectively, in association with each other for each of the scanned images set by a user operation.

11. The image processing apparatus according to claim 1, wherein the controller is further configured to:

transmit the scanned image to an external apparatus performing character recognition processing and receive the character recognition results for the plurality of handwritten character blocks and the printed character block in the scanned image from the external apparatus.

12. The image processing apparatus according to claim 11, wherein the controller is further configured to:

obtain, in a case where a format of the document of the transmitted scanned image is similar to a format of a document registered in advance in the external apparatus, the character recognition results for the plurality of handwritten blocks and the printed character block, respectively, which are determined based on a rule set to the format of the document registered in advance in the external apparatus.

13. The image processing apparatus according to claim 1, wherein the object is a ruled line or a frame line.

14. The image processing apparatus according to claim 1, wherein the first single continuous character string, displayed on the UI screen, corresponds to a file name of the scanned image.

15. The image processing apparatus according to claim 1, wherein the controller is further configured to:

separate blocks into the plurality of handwritten character blocks and the printed character block corresponding to the plurality of strings of handwritten characters and the string of printed characters, respectively, which are included in the scanned image, by analyzing the scanned image; and perform character recognition processing on the separated plurality of handwritten character blocks and the separated printed character block.

16. An image processing method comprising:

obtaining a scanned image by scanning a document including a plurality of strings of handwritten characters and a string of printed characters;

obtaining character recognition results for a plurality of handwritten character blocks corresponding to the plurality of strings of handwritten characters included in the scanned image, character recognition results for a printed character block corresponding to the string of printed characters included in the scanned image, and an object other than characters included in the scanned image; and displaying the scanned image on a UI screen for a user to designate a character area in the scanned image; and in a case where the character area designated by the user includes: (i) the plurality of strings of handwritten characters and (ii) the string of printed characters or the object exists between the plurality of handwritten characters:

inserting a predetermined delimiter character in place of the string of printed characters or the object existing between the plurality of strings of handwritten characters; and displaying on the UI screen a first single continuous character string combining the character recognition results for the plurality of handwritten character blocks corresponding to the plurality of strings of handwritten characters and the predetermined delimiter character between the plurality of handwritten character blocks.

17. A non-transitory computer readable storage medium storing a program executable by a computer to perform an image processing method comprising:

obtaining a scanned image by scanning a document including a plurality of strings of handwritten characters and a string of printed characters;

obtaining character recognition results for a plurality of handwritten character blocks corresponding to the plurality of strings of handwritten characters included in the scanned image, character recognition results for a printed character block corresponding to the string of printed characters included in the scanned image, and an object other than characters included in the scanned image; and displaying the scanned image on a UI screen for a user to designate a character area in the scanned image; and in a case where the character area designated by the user
includes: (i) the plurality of strings of handwritten
characters and (ii) the string of printed characters or the
object exists between the plurality of handwritten char-
acters:

inserting a predetermined delimiter character in place
of the string of printed characters or the object
existing between the plurality of strings of handwrit-
ten characters; and displaying on the UI screen a first single continuous
character string combining the character recognition
results for the plurality of handwritten character
blocks corresponding to the plurality of strings of
handwritten characters and the predetermined delim-
iter character between the plurality of handwritten
character blocks.

\*    \*    \*    \*    \*